US00RE37083E

(19) United States
(12) Reissued Patent
Kanazawa

(10) Patent Number: US RE37,083 E
(45) Date of Reissued Patent: Mar. 6, 2001

(54) METHOD AND APPARATUS FOR DRIVING SURFACE DISCHARGE PLASMA DISPLAY PANEL

(75) Inventor: Yoshikazu Kanazawa, Kawasaki (JP)

(73) Assignee: Fujitsu Limited, Kawasaki (JP)

(21) Appl. No.: 08/870,660

(22) Filed: Jun. 6, 1997

Related U.S. Patent Documents

Reissue of:
(64) Patent No.: 5,446,344
Issued: Aug. 29, 1995
Appl. No.: 08/188,756
Filed: Jan. 31, 1994

(30) Foreign Application Priority Data

Dec. 10, 1993 (JP) ..... 5-310937

(51) Int. Cl.[7] ..... G09G 3/10

(52) U.S. Cl. ..... 315/169.4; 315/169.3; 313/585; 313/586

(58) Field of Search ..... 315/169.4, 169.3, 315/169.2, 169.1, 168, 167, 58, 71; 313/585, 586, 587, 584, 590

(56) References Cited

U.S. PATENT DOCUMENTS

| | | | | |
|---|---|---|---|---|
| 4,737,687 | | 4/1988 | Shinoda et al. | 315/169.4 |
| 5,315,213 | * | 5/1994 | Kim | 315/169.1 |
| 5,331,252 | * | 7/1994 | Kim | 315/169.4 |
| 5,332,949 | * | 7/1994 | Kim | 315/169.4 |

FOREIGN PATENT DOCUMENTS

| | | | |
|---|---|---|---|
| 0488891 | * | 6/1992 | (EP) . |
| 0 549 275 | | 6/1993 | (EP) . |
| 4195188 | * | 7/1992 | (JP) . |
| 8-63123 | | 3/1996 | (JP) . |

OTHER PUBLICATIONS

Nanto et al., "A 15–in.–Diagonel Color Surface Discharge AC–Plasma Display Panel," Japan Display '89, pp. 202–205.*

Shinoda et al., "Improvement of Luminance and Luminous Efficiency of Surface–Discharge Color ac PDP," SID 91 Digest, pp. 724–727.*

Yoshikawa et al., "A Full Color AC Plasma Display with 256 Gray Scale," Japan Display '92 Digest, pp. 605–608.*

Kanagu et al., "A 31–in.–Diagonal Full–Color Surface–Discharge AC Plasma Display Panel," SID '92 Digest, pp. 724–727.*

Shinoda et al., "Invited Address: Development of Technologies for Large–Area Color ac Plasma Displays," SID 93 Digest, pp. 161–164.*

Patent Abstracts of Japan; Publication No. 08063123 A, Publication Date Mar. 8, 1996; Appl. No. 06202143, Appl. Date Aug. 26, 1994.

Patent Abstracts of Japan; Publication No. 04 291293, Publication Date Oct. 15, 1992; Appl. No. 03 055038, Appl. Date Mar. 19, 1991.

* cited by examiner

*Primary Examiner*—Michael B Shingleton
(74) *Attorney, Agent, or Firm*—Staas & Halsey LLP

(57) ABSTRACT

A method of driving a surface discharge plasma display panel has a reset step of applying a pulse of a first voltage to paired first and second electrodes, a write step of applying a pulse of a second voltage to second and third electrodes corresponding to cells to be turned ON, and a sustain discharge step of applying an AC pulse of a fourth voltage to the paired first and second electrodes. The pulse of the first voltage is so set that it is higher than a first discharge start voltage, a third voltage caused by the discharge is higher than the first discharge start voltage, and the first, second, and third electrodes have the same potential after the application of the pulse of the first voltage. Therefore, an address discharge of the surface discharge plasma display panel can be caused by a wide range of voltages, and display quality of the panel can be improved.

46 Claims, 25 Drawing Sheets

PROCESS(a)

PROCESS(b)

PROCESS(c)

PROCESS(d)

PROCESS(e)

PROCESS(f)

(i)
(ii)
(iii)

(i)
(ii)
(iii)

(i)
(ii)
(iii)
a
b
c
d
e
f
0V (i) (ii) (iii) (iv)

(i) (ii) (iii) (iv) (v)

| Fig.17A | Fig.17B |
|---|---|

Fig.21A

| TSC (ATSC) | SUS (ASUS) | STB (ASTB) | D | OUTPUT STATE |
|---|---|---|---|---|
| L | X | X | X | HIGH IMPEDANCE (PULL UP TRANSISTOR:OFF, PULL DOWN TRANSISTOR:OFF) |
| H | L | X | X | GND (PULL UP TRANSISTOR:OFF, PULL DOWN TRANSISTOR:ON) |
| H | H | L | X | VDH (PULL UP TRANSISTOR:ON, PULL DOWN TRANSISTOR:OFF) |
| H | H | H | L | GND (PULL UP TRANSISTOR:OFF, PULL DOWN TRANSISTOR:ON) |
| H | H | H | H | VDH (PULL UP TRANSISTOR:ON, PULL DOWN TRANSISTOR:OFF) |

Fig. 21B

| TSC (YTSC) | STB (YSTB) | D | OUTPUT STATE | |
|---|---|---|---|---|
| L | X | X | HIGH IMPEDANCE (PULL UP TRANSISTOR:OFF, PULL DOWN TRANSISTOR:OFF) | |
| H | H | X | VDH (PULL UP TRANSISTOR:ON, PULL DOWN TRANSISTOR:OFF) | |
| H | L | H | GND (PULL UP TRANSISTOR:OFF, PULL DOWN TRANSISTOR:ON) | : Y ELECTRODE IS SELECTED |
| H | L | L | VDH (PULL UP TRANSISTOR:ON, PULL DOWN TRANSISTOR:OFF) | : Y ELECTRODE IS NON-SELECTED |

METHOD AND APPARATUS FOR DRIVING SURFACE DISCHARGE PLASMA DISPLAY PANEL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method and an apparatus for driving a surface discharge plasma display panel, and more particularly, to a method and an apparatus for driving a three-electrode surface-discharge alternating-current plasma display panel (AC PDP).

2. Description of the Related Art

Recently, flat display panels such as AC PDPs are required to have large screens, large capacity, and the ability to display full-color images. In particular, the AC PDPs are required to provide more display lines and intensity levels and stably rewrite their screens without decreasing the luminance of the screens.

Conventionally, a line-by-line self-erase addressing method for driving the PDP is proposed. In the prior art driving method, wall charges (which are charges caused on the surface of the wall) remain during the reset period, and decrease the address discharge. Fluctuations in the remnant wall charges narrow the range of the potential for securing the stable operation of the PDP under various conditions. The fluctuations also change an optimum value of the potential, to destabilize the operation of the PDP or lower the display quality thereof.

Further, in another prior art driving method, for example, 256 shades of gray can be realized by dividing a frame into eight sub-fields (which are disclosed in, for example, Japanese Unexamined Patent Publication (Kokai) No. 4-195188 and Japanese Patent Application No. 4-340498). In this driving method, two to three times of discharge should be carried out in the reset period, to uniformly distribute wall charges and secure stable operation. However, the discharge produces light even when displaying black, and thus the contrast of PDP is deteriorated. Note that the related art and the problems thereof will be briefly explained later.

SUMMARY OF THE INVENTION

An object of the present invention is to provide a method and an apparatus for driving a surface discharge plasma display panel with a wide range of voltages for causing address discharge, to improve the display quality of the panel. Further, another object of the present invention is to provide a method and an apparatus for driving a surface discharge plasma display panel that displays black with low luminance, to improve the display quality of the panel.

According to the present invention, there is provided a method of driving a surface discharge plasma display panel having a first substrate, first and second electrodes arranged in parallel with each other on the first substrate and paired for respective display lines, a second substrate spaced apart from and facing the first substrate, third electrodes arranged on the first or second substrate away from and orthogonal to the first and second electrodes, wherein the method comprises a reset step of applying a pulse of a first voltage to the paired first and second electrodes; a write step of applying a pulse of a second voltage to the second and third electrodes corresponding to cells to be turned ON; and a sustain discharge step of applying an AC pulse of a fourth voltage to the paired first and second electrodes, wherein the pulse of the first voltage being so set that it is higher than a first discharge start voltage, a third voltage caused by the discharge is higher than the first discharge start voltage, and the first, second, and third electrodes have the same potential after the application of the pulse of the first voltage.

The plasma display panel may have a wall charge accumulating dielectric layer covering the surfaces of the first and second electrodes, a phosphor formed over the second substrate, a discharge gas sealed in a cavity defined between the first and second substrates, and cells formed at intersections where the first and second electrodes cross the third electrodes; the reset step may be used to cause discharge between the first and second electrodes and uniformly distribute charges over the dielectric layer; the write step may be used to cause discharge between the second and third electrodes, so that predetermined quantities or more of first and second wall charges of opposite polarities are accumulated on the dielectric layer on the first and second electrodes, respectively, in the cells to be turned ON; the sustain discharge step may be used to turn ON the cells in which the sum of the third voltage between the first and second wall charges and the fourth voltage having the same polarity as the third voltage exceeds a first discharge start voltage, and to alternate the opposite polarities of the first and second wall charges; and the reset step, the write step, and the sustain discharge step may be repeatedly carried out, so that the polarity of the AC pulse in the sustain discharge step is opposite to that of the pulse of the first voltage in the reset step. An erase pulse that is lower than the first discharge start voltage and gently rises may be applied to the first and second electrodes after the application of the pulse of the first voltage during a reset period, to add the voltage of the erase pulse to the first and second wall charges that have not been erased by the pulse of the first voltage due to abnormalities in the cells, thereby discharging and erasing the remnant wall charges.

The polarities of the first and second wall charges that have not been erased by the pulse of the first voltage due to abnormalities in the cells may be integrated and amplified by applying a pulse that is lower than the first discharge start voltage and has an opposite polarity to the first voltage as well as a pulse that is lower than the first discharge start voltage and has the same polarity as the first voltage to the first and second electrodes in an interval between the pulse of the first voltage and the erase pulse, and wherein the polarity of the erase pulse may be inverted with respect to the polarity of the first voltage, thereby erasing more of the remnant wall charges with the erase pulse.

The potential of the third electrodes may be substantially equal to the average of the potential of the first and second electrodes during the application of the pulse of the first voltage. The pulse of the first voltage may be generated by setting the second electrodes to a ground level and by applying a pulse of a positive voltage to the first electrodes. The potential of the third electrodes may be set to a ground level during the application of the pulse of the first voltage.

The potential of the first, second, and third electrodes may be at the ground level before and after the application of the pulse of the first voltage. In the write step, the second voltage may be greater than a second discharge start voltage between the second and third electrodes, and a pulse of a fifth voltage Vs may be applied to the first and second electrodes, where "Vsmin<=Vs<Vfxymin," Vsmin is a functional minimum for the fourth voltage, and Vfxymin is the first discharge start voltage. The fifth voltage may be close to the first discharge start voltage. The width of the pulse of the second voltage may be narrower than that of the pulse of the fifth voltage.

The pulse of the second voltage may be a positive pulse applied to the third electrodes when the potential of the second electrodes is negative with respect to the ground level and the third electrodes are at the ground level; and the pulse of the fifth voltage may be a negative pulse applied to the second electrodes when the potential of the first electrodes is equalized with the potential of the third electrodes. The potential of the second electrodes may be about ¼ to ¾ of the fifth voltage.

The potential of the third electrodes may be positive with respect to the ground level in the sustain discharge step. A positive pulse whose potential difference with respect to the third electrodes is about ¼ to ¾ of the fourth voltage may be simultaneously applied to the first and second electrodes before the first pulse of the fourth voltage is applied in the sustain discharge step. An output end of a drive circuit connected to the third electrodes may be provided with high impedance in the sustain discharge step. All cells may be simultaneously subjected to the reset step; the second electrodes may be sequentially subjected to the write step; and all of the first and second electrodes may be simultaneously subjected to the sustain discharge step.

Further, according to the present invention, there is also provided an apparatus for driving a surface discharge plasma display panel having a first substrate, first and second electrodes arranged in parallel with each other on the first substrate and paired for respective display lines, a second substrate spaced apart from and facing the first substrate, third electrodes arranged on the first or second substrate away from and orthogonal to the first and second electrodes, wherein the apparatus comprises a reset unit for applying a pulse of a first voltage to the paired first and second electrodes; a write unit for applying a pulse of a second voltage to the second and third electrodes corresponding to cells to be turned ON; and a sustain discharge unit for applying an AC pulse of a fourth voltage to the paired first and second electrodes, wherein the pulse of the first voltage being so set that it is higher than a first discharge start voltage, a third voltage caused by the discharge is higher than the first discharge start voltage, and the first, second, and third electrodes have the same potential after the application of the pulse of the first voltage.

The first electrode may receive an output of an X-common driver, the second electrodes may receive outputs of Yi-drive circuits, and the third electrodes may receive outputs of Aj-drive circuits; and the Yi-drive circuits may be connected to a Y-common driver, the second electrodes may be driven by a positive pulse during a sustain discharge period, and the second electrodes may be driven by negative pulses during an address period. The Y-common driver may include a first switching unit for preventing an unnecessary current flow into the Yi-drive circuits caused by using the positive and negative pulses. The first switching unit may be controlled by a second switching unit which is used to apply the negative pulses to the second electrodes through the Yi-drive circuits.

BRIEF DESCRIPTION OF THE DRAWINGS

The present invention will be more clearly understood from the description of the preferred embodiments as set forth below with reference to the accompanying drawings, wherein:

FIGS. 21A and 21B are diagrams showing tables of truth value of logic circuits of FIGS. 19 and 20.

DESCRIPTION OF THE PREFERRED EMBODIMENTS

For a better understanding of the preferred embodiments, the problems of the prior art will be explained.

Figure 1A:
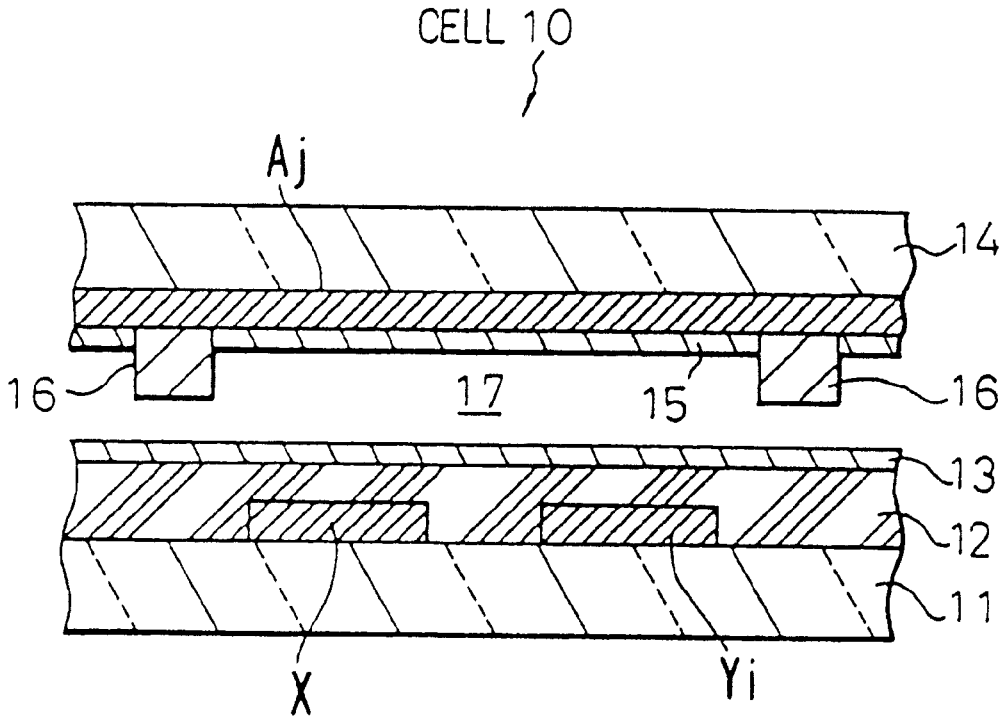
Fig.1A (PRIOR ART)
FIG. 1A is a sectional diagram showing a cell in a plasma display panel.
Figure 1B:
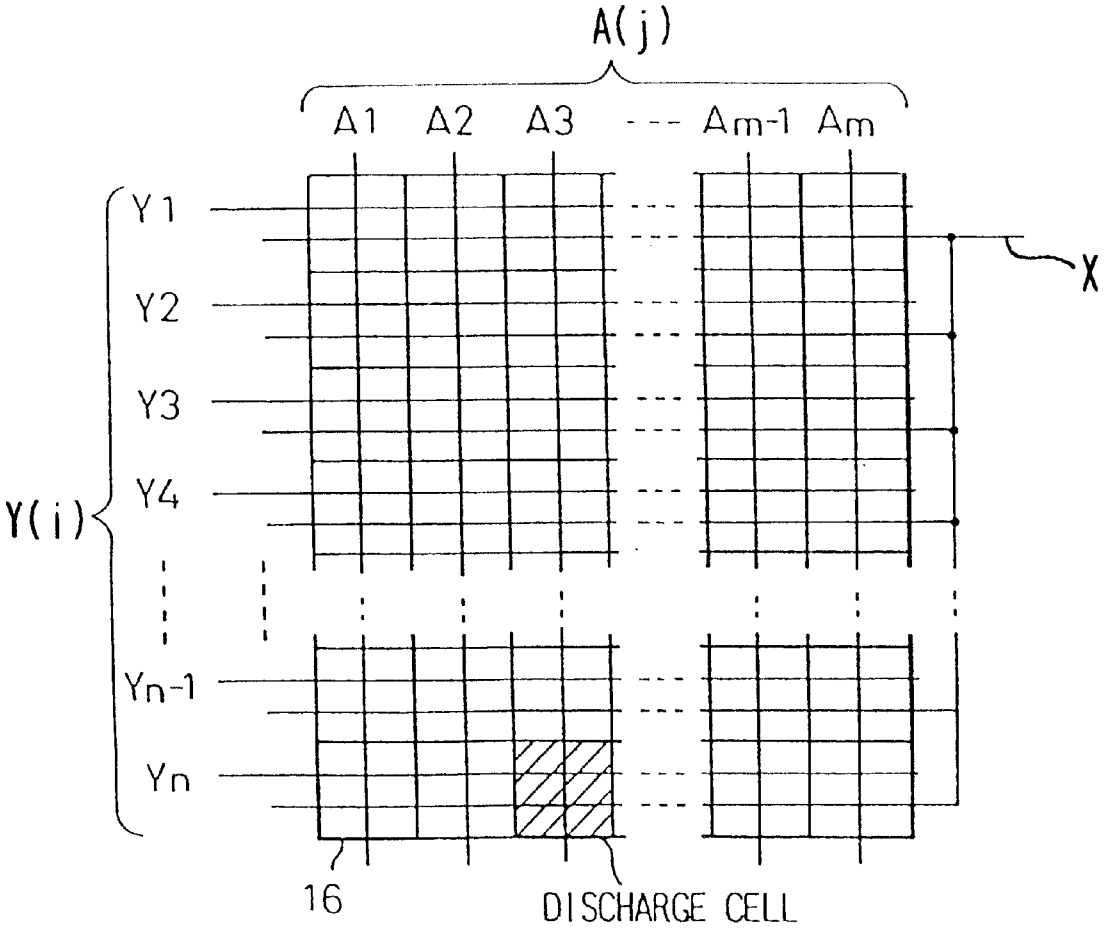
Fig.1B (PRIOR ART)
FIG. 1B is a diagram schematically showing a structure of a plasma display panel.

FIG. 1A shows a sectional diagram of a cell in a plasma display panel, and FIG. 1B schematically shows a structure (electrodes and m×n dots) of a plasma display panel. Note that FIG. 1A shows a cell forming a pixel at an intersection of the "i"th line (Yi) and "j"th column (Aj) of a surface discharge plasma display panel (PDP) having three electrodes shown in FIG. 1B.

In FIG. 1A, reference numeral 11 denotes a rear glass substrate, 12 denotes a dielectric layer, 13 denotes a MgO protective film, 14 denotes a front glass substrate, 15 denotes a fluorescent material (dielectric phosphor) deposited between the walls, 16 denotes a partition wall, and 17 denotes a discharge cavity. Further, reference mark Aj denotes an address electrode, and X and Yi denote sustain electrodes. Note that a pair of sustain electrodes X and Yi run perpendicular to the plane of the figure.

As shown in FIG. 1A, sustain electrodes X and Yi are formed on the glass substrate 11 and is covered with the dielectric layer 12 for accumulating wall charges. The dielectric layer 12 is covered with the MgO protective film 13. The address electrode Aj extends in parallel with the plane of the figure and is formed on a glass substrate 14 that faces the glass substrate 11. The address electrode Aj is covered with a dielectric phosphor 15. The partition wall 16 is formed on the glass substrate 14 along a boundary of the pixel. The discharge cavity 17 is defined between the MgO protective film 13 and the phosphor 15. Penning mixtures such as Ne+Xe are sealed in the cavity 17.

As shown in FIG. 1B, the PDP (plasma display panel) has "n×m" pixels with i=1 to n and j=1 to m. To turn ON and OFF a cell (pixel) formed at an intersection of an optional one of the sustain electrodes Yi and an optional one of the address electrodes Aj, the sustain electrodes Y1 to Yn are insulated from one another, and the address electrodes A1 to Am are insulated from one another. The sustain electrodes X extend in parallel with the sustain electrodes Y1 to Yn, respectively, and one end of each of the sustain electrodes X are connected together.

Figure 1C:
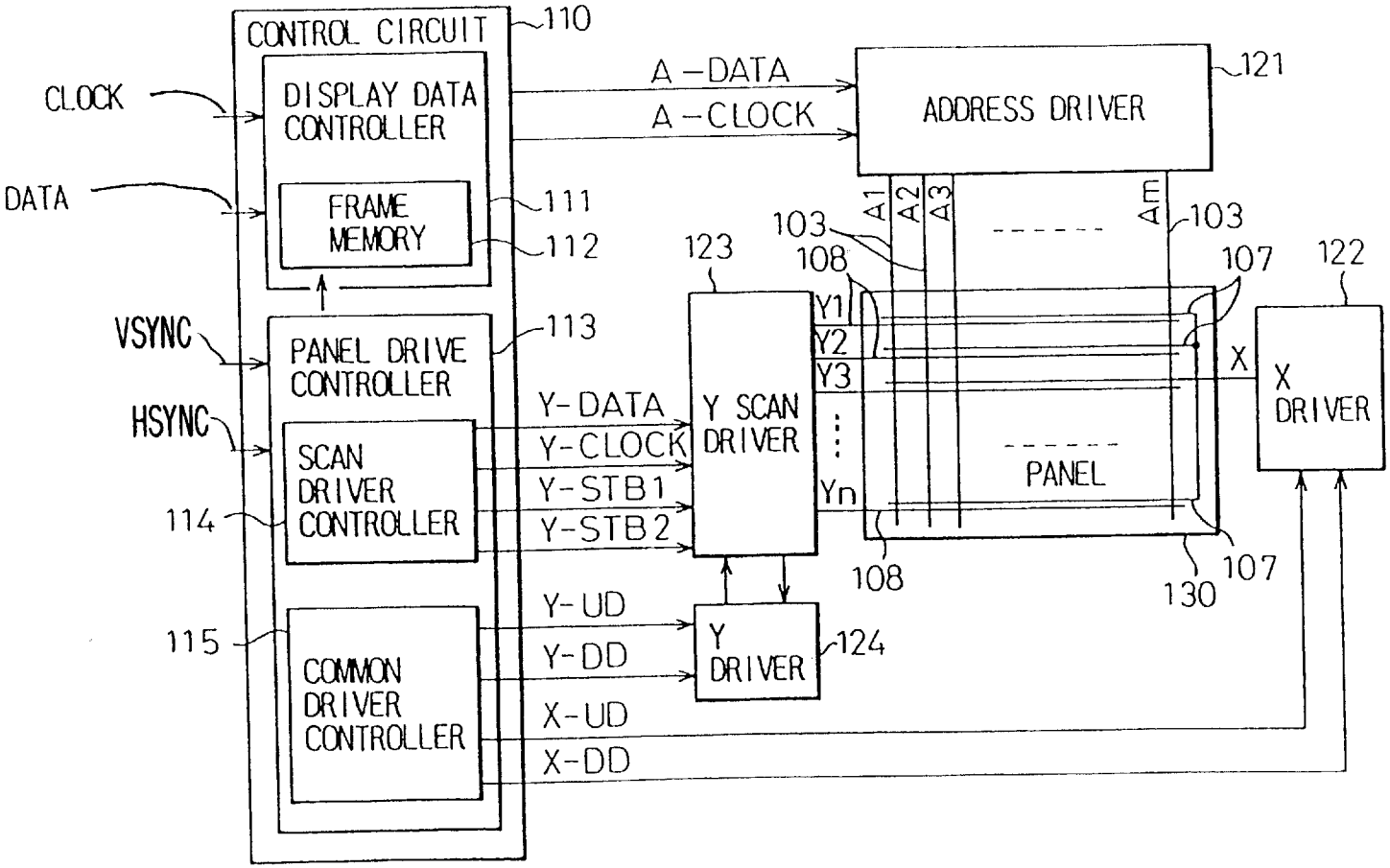
Fig.1C (PRIOR ART)
FIG. 1C is a block diagram showing an example of a three-electrode surface-discharge alternating-current plasma display panel device using the plasma display panel shown in FIG. 1B.

FIG. 1C shows an example of a three-electrode surface-discharge alternating-current plasma display panel (AC PDP) device using the plasma display panel shown in FIG. 1B.

In FIG. 1C, reference numeral 110 denotes a control circuit, 111 denotes a display data controller, 112 denotes a frame memory, 113 denotes a panel drive controller, 114 denotes a scan driver controller, and 115 denotes a common driver controller. Further, reference numeral 121 denotes an address driver, 122 denotes an X driver, 123 denotes a Y scan driver, 124 denotes a Y driver, and 130 denotes a plasma display panel.

Further, in FIG. 1C, reference mark CLOCK denotes a dot clock indicating display data, DATA denotes display data (in case of 256 gray scales, 8 bits for each color: 3×8), VSYNC denotes a vertical synchronous signal, which indicates the beginning of a frame (one field), and HSYNC denotes a horizontal synchronous signal.

As shown in FIG. 1C, the control circuit 110 comprises a display data controller 111 and a panel drive controller 113. The display data controller 111 used to store the display data in the frame memory 112 and then to transfer it to the address driver 121 in synchronizing with the driving timing of the panel. Note that, reference mark A-DATA denotes display data and A-CLOCK denotes a transfer clock.

The panel drive controller 113 is used to determine when to apply a high voltage wave (pulse) to the panel (PDP) 130 and is provided with the scan driver controller 114 and the common driver controller 115. Note that, reference mark Y-DATA denotes scan data (data for turning ON a Y scan driver every bit), Y-CLOCK denotes a transfer clock (a clock for turning ON a Y scan driver every bit), Y-STB1 denotes a Y strobe-1 (a signal for regulating the timing of turning ON the Y scan driver), and Y-STB2 denotes a Y strobe-2. Further, reference mark X-UD denotes a signal (outputs Vs/Vw) for controlling the ON/OFF of the common driver of the X side (X driver 122), X-DD denotes a signal (GND) for controlling the ON/OFF of the X driver 122, Y-UD denotes a signal (outputs Vs/Vw) for controlling the ON/OFF of the Y side common driver (Y driver 124), and Y-DD denotes a signal (GND) for controlling the ON/OFF of the Y driver 124.

As shown in FIG. 1C, each of the address electrodes 103 is connected to the address driver 121 and receives an address pulse at the address discharge time from the address driver. Further, Y electrodes 108 are individually connected to the Y scan driver 123, and the Y scan driver 123 is connected to the Y driver 124. The address discharge time pulse is generated by the Y scan driver 123, and the sustain pulses and others are generated by the Y driver 24 and applied to the Y electrodes 108 through the Y scan driver 123. Further, the X electrodes 107 are connected in common to all the display lines of the panel 130. Note that the X driver 122 is used to generate write pulses, sustain pulses, and the like. These driver circuits (121, 122, 123, 124) are controlled by the control circuit 110, which is controlled by synchronous signals, display data signals, and the like supplied from outside the AC PDP device.

Figure 2:
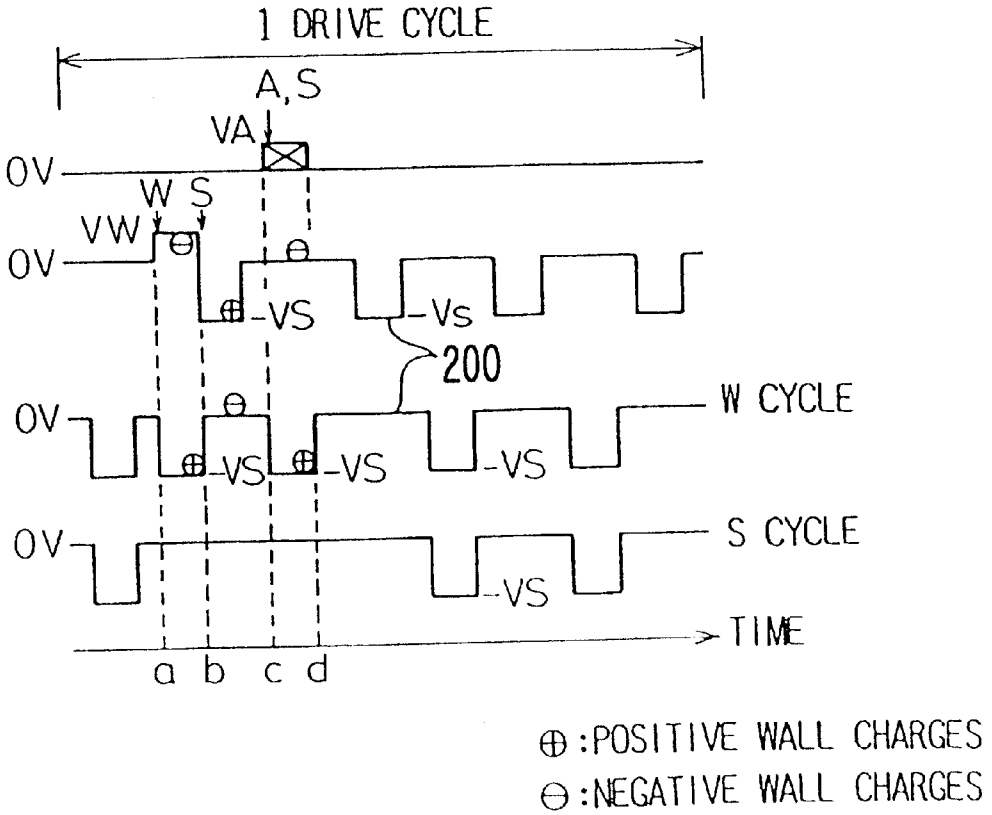
Fig.2 (PRIOR ART)
FIG. 2 is a diagram showing voltage waveforms applied to electrodes according to a plasma display panel driving method based on a first prior art.

FIG. 2 shows a cycle of voltage waveforms applied to the electrodes according to a first prior art method for driving the PDP. Namely, FIG. 2 shows one driving cycle in "line-by-line self-erase addressing method" of the prior art. In FIG. 2, (i), (ii), (iii) and (iv) are waveforms of address electrodes Aj, sustain electrodes X, selected sustain electrode Ys, and unselected sustain electrodes Yt, respectively. Also, in FIG. 2, "W" corresponds to a write discharge in all cells in a selected line, "A" corresponds to a self-erase address discharge in specified cells in a selected line, and "S" corresponds to a sustain discharge.

In this prior art line-by-line self-erase addressing method, the sustain electrodes Yi are sequentially selected from Y1 to Yn. Further, in the following explanations, a selected one of the sustain electrodes Yi is represented by Ys and the remaining unselected electrodes by Yt. For example, if s=1, then t=2 to n. A line of cells corresponding to the sustain electrode Ys is called the selected line, and lines of cells corresponding to the unselected sustain electrodes Yt are called the unselected lines. In the selected line, the address electrodes Aj corresponding to cells to be turned ON are represented by Aa and the cells to be turned OFF are represented by Ab.

First, the sustain electrodes Yt are set to 0V, and a write pulse of potential VW is applied to the sustain electrodes X. At the same time, a pulse of potential VS is applied to the sustain electrode Ys.

A discharge start voltage between the sustain electrodes X and Yi is Vfxy. The potential VW is set as follows:

$$VS+VW>Vfxy>VW \quad (1)$$

(Note that the determining of the potential VS will be explained later.)

All cells in the selected line cause write discharge W between the sustain electrodes X and Ys. As the discharge develops, electrons, i.e., negative wall charges accumulate over the protective film 13 on the sustain electrode X corresponding to the selected line (hereinafter referred to as the sustain electrode X side). On the other hand, ions, i.e., positive wall charges accumulate over the protective film 13 on the sustain electrode Ys. These wall charges reduce the strength of an electric field in the discharge cavity, so that the discharge quickly comes to an end within one to several microseconds. The voltage due to the wall charges at the end of the discharge is Vwall1.

Next, the sustain electrodes Ys and Yt are set to 0V, and a sustain pulse of −VS is applied to the sustain electrode X. The potential VS is determined as follows:

$$VS+Vwall1>Vf>VS \quad (2)$$

As a result, the sustain electrodes X and Ys of only the selected line cause a sustain discharge S. Opposite to the previous case, positive wall charges accumulate on the sustain electrode X side and negative wall charges on the sustain electrode Ys side.

Further, the sustain electrodes X and Yt and the address electrodes Aa are set to 0V, and a sustain pulse 200 of −VS is applied to the sustain electrode Ys. At the same time, an address pulse of −VA is applied to the address electrodes Ab. This causes a sustain discharge between the sustain electrodes X and Ys of the selected line. A discharge start voltage between the address electrodes Aj and the sustain electrodes Yi is Vfay, and the potential of the wall charges on the sustain electrode Ys side is Vwall2. The potential VA is set as follows:

$$VA+VS+Vwall2>Vfay>VS \quad (3)$$

In connection with the cells to be turned OFF in the selected line, the address electrodes Ab and sustain electrode Ys cause the address discharge to excessively accumulate positive wall charges on the sustain electrode Ys side. The potential VA is so set that the wall charges themselves start a discharge between the sustain electrodes X and Yi after the address discharge when the sustain electrodes X and Ys and the address electrodes Ab are set to 0V. This self-erase discharge cannot eliminate the wall charges because the amount of the wall charge is insufficient and because the time since the application of the address pulse is insufficient. The remnant wall charges will cause no problem if they cause no sustain discharge when a sustain pulse is added to them.

The cells that have self-erase discharged never cause sustain discharge and are kept in an OFF state even if sustain pulses are alternately applied to the sustain electrodes X and Yi. In connection with the cells to be turned ON, an address pulse is applied to the address electrodes Aj. Accordingly, the sustain pulses repeatedly cause the sustain discharge to turn ON the cells.

Figure 3:
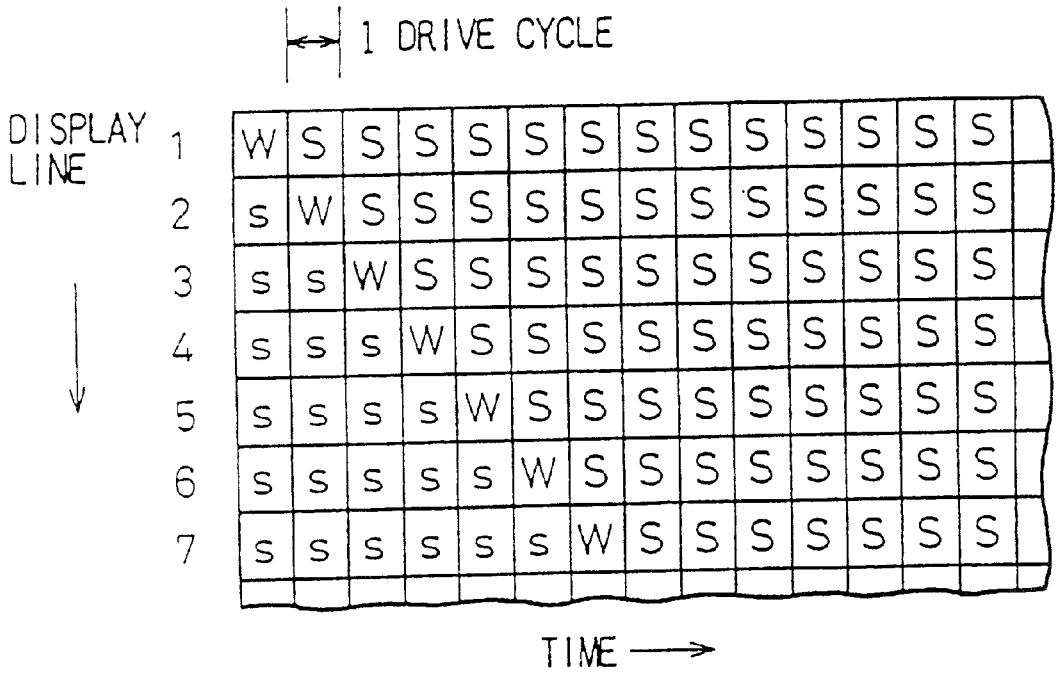
Fig. 3 (PRIOR ART)
FIG. 3 is a diagram for explaining changes in drive cycles in display lines according to the driving method of FIG. 2.

FIG. 3 shows changing drive cycles in display lines. An abscissa indicates time and an ordinate indicates the display lines. In FIG. 3, reference mark W denotes a drive cycle for writing display data, S denotes a drive cycle for carrying out sustain discharge in the present field, and s denotes a drive cycle for carrying out sustain discharge in the preceding field.

Figure 4:
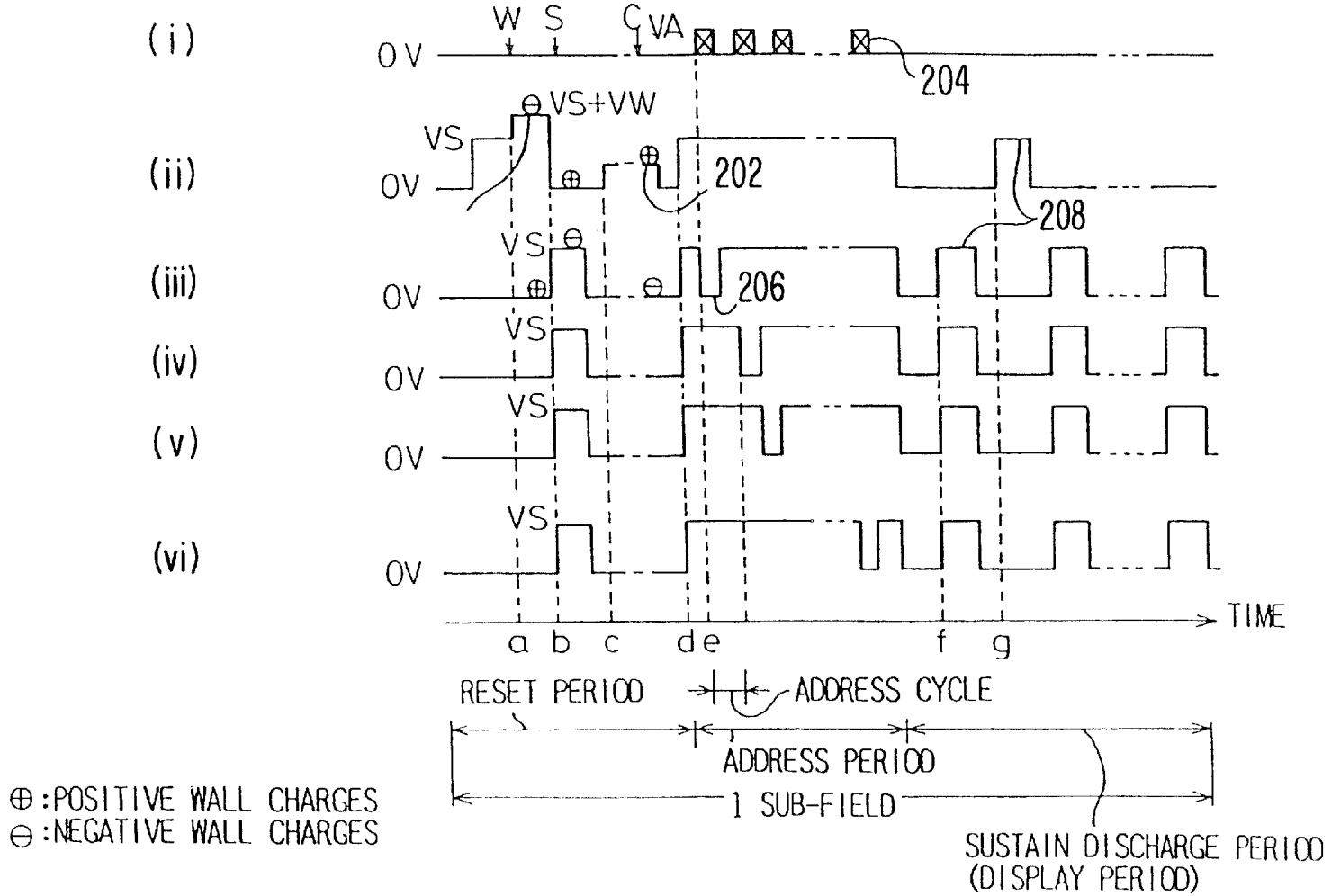
Fig.4 (PRIOR ART)
FIG. 4 is a diagram showing voltage waveforms applied to electrodes according to a plasma display panel driving method based on a second prior art.

FIG. 4 shows a sub-field of voltage waveforms applied to the electrodes according to a second prior art for driving the PDP. In FIG. 4, (i), (ii), (iii), (iv), (v) and (vi) are waveforms of address electrodes Aj, sustain electrodes X, sustain electrode Y1, sustain electrode Y2, sustain electrode Y3 and sustain electrode Yn, respectively. Also, in FIG. 4, "W" corresponds to a total write discharge, "S" corresponds to a sustain discharge, and "C" corresponds to a partial erase discharge.

This driving method employs a separate address-sustain discharge self-erase addressing method. Each sub-field involves a reset period in which a small quantity of wall charge is left in every cell, an address period in which address discharge is to accumulate wall charges to be used by the sustain discharge carried out afterward in pixels (cells) to be turned ON, and a sustain discharge period in which sustain pulses are added to the wall charges to cause sustain discharge only in the cells that have previously caused the address discharge.

First, during the reset period, the sustain electrodes Y1 to Yn are set to 0V, and a write pulse of VS+VW is applied to the sustain electrodes X. The potential VW is determined to satisfy the above equation (1). The sustain electrodes X and Y1 to Yn cause total write discharge W.

Next, the sustain electrodes X are set to 0V, and a sustain pulse of VS is applied to the sustain electrodes Y1 to Yn. The potential VS is determined to satisfy the above equation (2). The sustain electrodes X and Y1 to Yn cause total sustain discharge S.

Further, the sustain electrodes Y1 to Yn are set to 0V, and an erase pulse 202 of lower than the potential VS is applied to the sustain electrodes X. At the same time, an address pulse 204 of −VS is applied to the address electrodes Ab, to partly neutralize and reduce the wall charges. This results in leaving negative wall charges on the sustain electrodes Y1 to Yn. These remnant wall charges are used to cause the next address discharge with low potential VA. The quantity of the wall charges is determined so that the cells that have caused no address charge during the address period never cause sustain discharge in response to sustain pulses during the sustain discharge period.

Then, the address period starts.

First, the sustain electrodes X and Y1 to Yn are set to potential VS.

Next, the sustain electrode Y1 is selected. Namely, a scan pulse 206 is applied only to the sustain electrode Y1 among the electrodes Y1 to Yn. At the same time, an address pulse of VA is applied to the address electrodes Aa corresponding to the cells to be turned ON in the selected line, to cause write discharge in the cells. Then, the sustain discharge period starts.

Further, the sustain electrodes Y1 to Yn are provided with the same voltage waveform, and sustain pulses 208 are alternately applied to the sustain electrodes X and Y, to turn ON the cells to which data have been written in the address period.

The driving method of FIG. 4 makes wall charges remain during the reset period, to decrease the address discharge. Fluctuations in the remnant wall charges narrow the range of the potential VA for securing the stable operation of the PDP under various conditions. The fluctuations also change an optimum value of the potential VA, to destabilize the operation of the PDP or lower the display quality thereof. The remnant wall charges fluctuate due to the following reasons.

First, the wall charges formed by the total write discharge are dependent on an ON state of the preceding sub-field. Next, the impedance of drive circuits including the electrodes of the PDP fluctuate depending on temperature and vary the discharge characteristics. Further, the discharge characteristics of the cells are dependent on temperature.

The driving method of FIG. 2 accumulates wall charges on the sustain electrodes X and Ys before the address discharge, to cause the same problem as mentioned above.

Further, the driving method of FIG. 4 determines luminance according to the length of the sustain discharge period, i.e., the number of the sustain pulses.

In FIG. 4, a frame is divided into eight sub-fields SF1 to SF8. The ratio of the sustain discharge periods of the sub-fields SF1 to SF8 is 1:2:4:8:16:32:64:128 to realize 256 shades of gray.

If a screen is written at 60 Hz, a frame will last for 16.6 microseconds. If one frame involves 510 sustain discharge cycles (each with two times of discharge), the numbers of sustain discharge cycles in the sub-fields SF1 to SF8 are 2, 4, 8, 16, 32, 64, 128, and 256, respectively. If the period of the sustain discharge is eight microseconds, the total sustain discharge period in one frame will be 4.08 microseconds. If each sub-field includes a reset period of about 50 microseconds, one address cycle will be 3 microseconds for driving the PDP of 500 lines.

Figure 5:
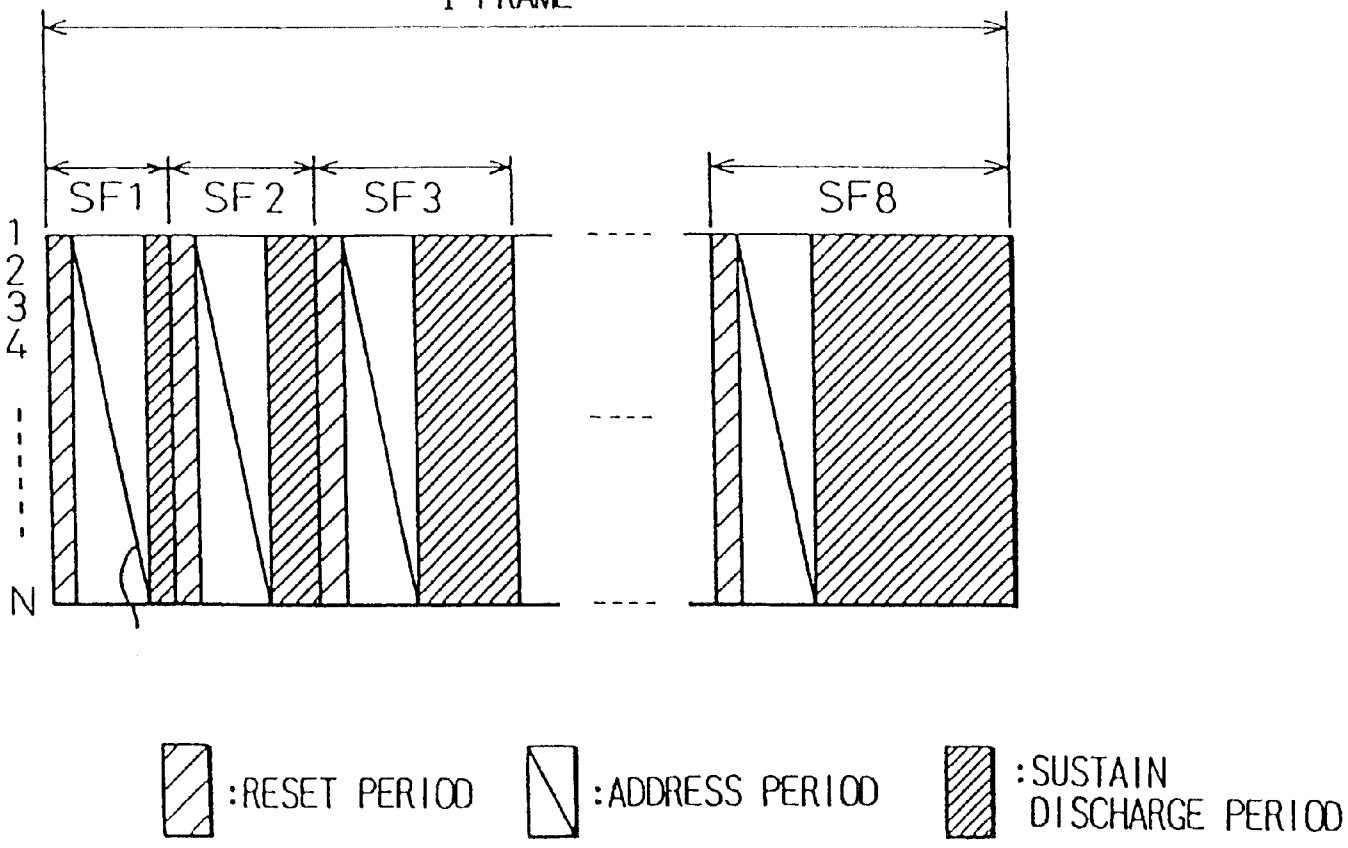
Fig. 5 (PRIOR ART)
FIG. 5 is a diagram showing a frame for displaying 256 shades of gray according to the method of FIG. 4.

It is important to carry out two to three times of discharge (three discharge cycles) in the reset period, to uniformly distribute wall charges and secure stable operation. This discharge, however, produces light even when displaying black and reduces contrast. According to the driving methods of FIGS. 4 and 5, the number of sustain discharge operations in one frame is, for example, 510×2=1020 (which is a relative value). A reset period in one sub-field involves three times of discharge, i.e., the total write discharge, sustain discharge, and erase discharge. Also, in FIG. 5, the respective address lines are denoted as 1 through N.

These discharge operations are stronger than the sustain discharge carried out in the sustain discharge period. Accordingly, the brightness due to the three times of discharge is about five times of that of normal sustain discharge. Accordingly, the ratio of the maximum luminance and the minimum luminance, i.e., the luminance of black is 1020:5×8=26:1.

This ratio is in a dark room. In a lighted room, the surface reflection of the PDP deteriorates contrast. This means that there is no reason to display many shades of gray. Since the quality of black is an important factor for the display quality of images, the contrast must be secured.

The driving method of FIG. 2 achieves, on every cell in a selected line, three times of discharge, i.e., the write discharge W, the next sustain discharge S, and sustain discharge S carried out in parallel with the address discharge even on cells to be turned OFF. These discharge operations deteriorate the ratio of the maximum luminance and the minimum luminance for black, similar to the previous case.

Next, the principle of the present invention will be explained.

Figure 6A:
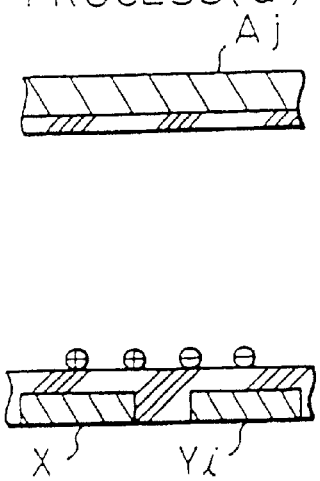
FIGS. 6A to 6F are diagrams for explaining processes of the self-erasing of wall charges according to a principle of the present invention.
Figure 6B:
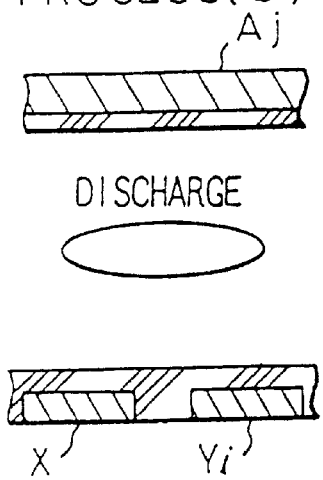
Figure 6C:
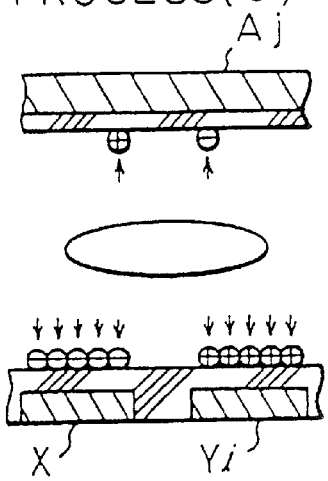
Figure 6D:
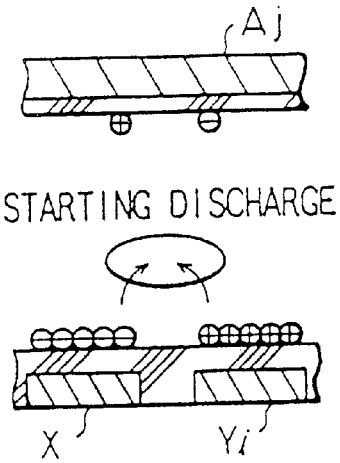
Figure 6E:
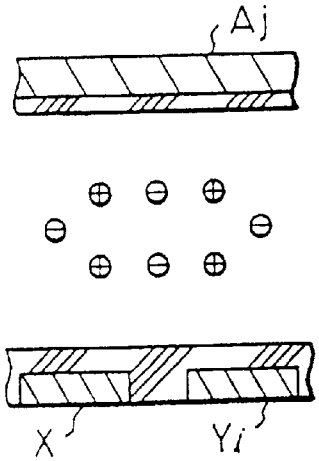
Figure 6F:
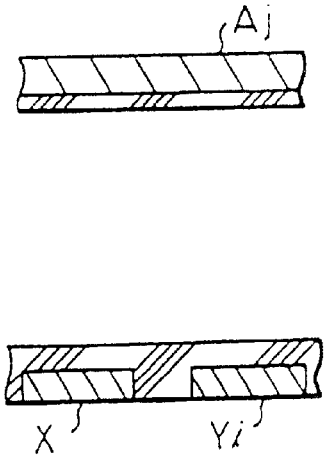
Figures 7A, 7B, 7C:
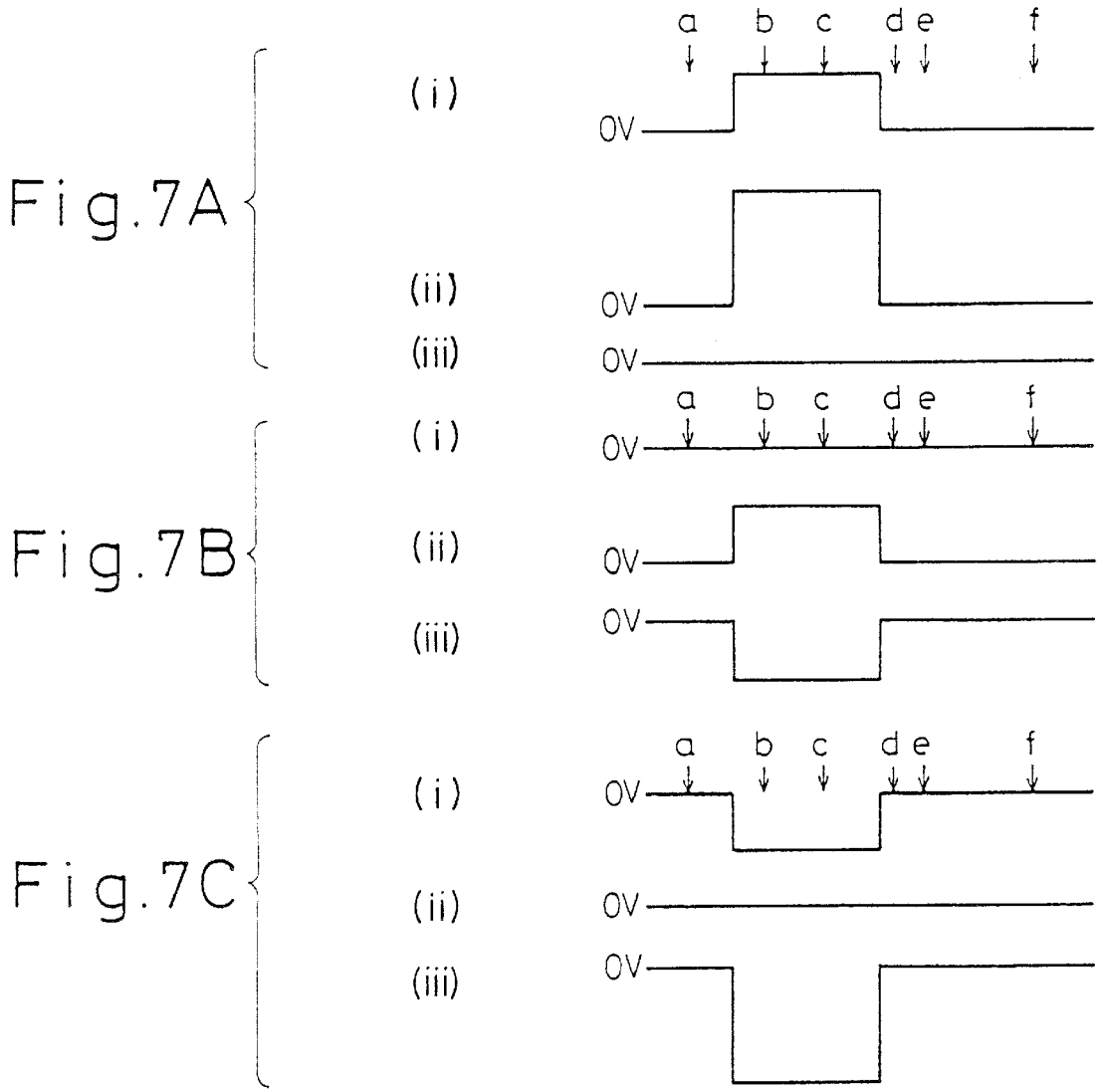
FIGS. 7A to 7C are diagrams showing voltage waveforms applied to electrodes according to the processes of FIGS. 6A to 6F.

FIGS. 6A to 6F show a process of the self-erasing of wall charges according to a principle of the present invention, and FIGS. 7A to 7C show voltage waveforms applied to electrodes according to the process of FIGS. 6A to 6F.

In a first invention, the surface discharge plasma display panel has first and second electrodes arranged on a first substrate, and the first and second electrodes run in parallel with each other and are paired for respective display lines. A second substrate is spaced apart from and faces the first substrate, and third electrodes Aj are arranged on the first or second substrate. The third electrodes (Aj) are arranged away from the first and second electrodes and orthogonal thereto, and the surfaces of the first and second electrodes are covered with a wall charge accumulating dielectric layer. A phosphor is formed over the second substrate, and a cavity defined between the first and second substrates seals a discharge gas. Intersections where the first and second electrodes cross the third electrodes Aj form cells, respectively.

In this first invention, a reset step is carried out to apply a pulse of first voltage to the paired first and second electrodes, to cause discharge between the electrodes so that charges are uniformly distributed over the dielectric layer. Further, a write step is carried out to apply a pulse of second voltage to the second and third electrodes corresponding to cells to be turned ON, to cause discharge between the electrodes so that predetermined quantities or more of first and second wall charges having opposite polarities are accumulated on the dielectric layer on the first (X) and second (Yi) electrodes, respectively, in the cells to be turned ON. Further, a sustain discharge step is carried out to apply an AC pulse of fourth voltage to the paired first and second electrodes so that the sum of a third voltage between the first and second wall charges and the fourth voltage having the same polarity as the third voltage exceeds a first discharge start voltage to turn ON the cells and so that the polarities of the first and second wall charges oppositely alternate at each discharge.

Note that these steps are repeated so that the polarity of the AC voltage pulse in the sustain discharge step may be opposite to the polarity of the pulse of first voltage in the reset step. As shown in FIGS. 7A to 7C, the pulse of first voltage is higher than the first discharge start voltage, and the third voltage caused by the discharge is higher than the first discharge start voltage. The first, second, and third electrodes have the same potential after the pulse of first voltage is applied. In FIG. 7A, (i) , (ii) and (iii) are waveforms of third electrodes Aj, first electrodes X and second electrodes Yi, respectively. In FIG. 7B, (i) , (ii) and (iii) are waveforms of third electrodes Aj, first electrodes X and second electrodes Yi, respectively. Similarly, in FIG. 7C, (i) , (ii) and (iii) are waveforms of third electrodes Aj, first electrodes X and second electrodes Yi, respectively.

In FIGS. 6A to 6F, the second electrodes Yi are formed on the second substrate. The present invention is applicable to a conventional structure in which the second electrodes Yi are formed on the first substrate on the second substrate side or on the opposite side with respect to the first and second electrodes X and Yi.

The reset step of the first invention will be explained with reference to FIGS. 6A to 6F and 7A to 7C.

First, as shown in FIG. 6A, in process (a), before the reset step (process (b)), the quantity of wall charges differ from cell to cell depending on the preceding displaying conditions. The preceding sustain step is completed so that a pulse of first voltage produced in the following process (b) is additive to the wall charges.

Next, as shown in FIG. 6B, in process (b), the pulse of first voltage is applied to the first and second electrodes X and Yi. This first voltage is higher than the first discharge start voltage between the first and second electrodes X and Yi, so that, even if there are no wall charges, large discharge compared with the discharge in the sustain discharge step occurs between these electrodes.

Further, as shown in FIG. 6C, in process (c), electrons and positive ions produced by the discharge are attracted by the first and second electrodes X and Yi whose polarities are opposite to those of the electrons and ions. The electrons and ions are accumulated on the dielectric layer 1, to form first wall charges on the first electrode X and second wall charges on the second electrode Yi. These wall charges reduce the strength of an electric field in the discharge cavity, so that the discharge quickly ends within one to several microseconds.

Next, as shown in FIG. 6D, in process (d), the pulse of first voltage is so set that the third voltage between the first and second wall charges is higher than the first discharge start voltage. Accordingly, strong discharge compared with the discharge in the sustain discharge step is again caused.

Further, as shown in FIG. 6E, in process (e), due to this strong discharge and due to the fact that the first, second, and third electrodes have the same potential, substantially no wall charges are accumulated, and space charges are almost completely neutralized. This sort of self-erase discharge will never be caused by the sustain discharge even if the first, second, and third electrodes have the same potential.

Furthermore, as shown in FIG. 6F, in process (f), the cavity will contain some space charges that have not been recombined. These space charges serve as a pilot for easily causing discharge in the next address discharge period. A wait time required for almost completing the self-erase discharge is about five microseconds or more, although it is dependent on the material and size of the cells and the kind and concentration of the sealed gas. If the wait time is too long, time for other processes will be shortened and the priming effect will be reduced. Accordingly, the wait time must be shorter than 50 microseconds.

The first invention carries out the self-erase discharge to almost completely neutralize the wall charges, and to equalize conditions around the first and second electrodes when writing data in cells to be turned ON. This results in expanding the range of the second voltage in the write step, to always achieve stable address discharge with no regard to the distribution conditions of charges before the write discharge onto fluctuations in temperature. The first invention prevents write errors and improves the display quality of the PDP.

For cells to be turned OFF, no discharge is carried out between the first and second electrodes. This results in improving the ratio of the maximum luminance and the minimum luminance for displaying black as well as the display quality of shades of gray compared with the prior art.

Note that the potential of the third electrodes Aj is about the average of the potential of the first and second electrodes X and Yi while the pulse of first voltage is being applied, as shown in FIGS. 7A to 7C.

Further, the voltage of the third electrodes Aj with respect to the first electrodes X and the voltage of the third electrodes Aj with respect to the second electrodes Yj have substantially the same absolute value and opposite signs. Accordingly, the third electrodes Aj produce substantially the same attractive force on positive and negative charges, and therefore, the positive and negative charges are neutralized on the third electrodes Aj. As a result, substantially no wall charges are accumulated on the third electrodes Aj, to thereby improve the effect of the first invention.

In addition, the pulse of first voltage is generated by setting the second electrodes Yi to a ground level and by applying a pulse of positive voltage to the first electrodes X, as shown in FIG. 7A. This configuration requires no negative high voltage pulse, so that a simple, compact, inexpensive power source is employable for the PDP drive circuit.

Further, the potential of the third electrodes Aj is kept at a ground level during the application of the pulse of first voltage, as shown in FIG. 7B. This configuration is capable of reducing the power source requirements.

Furthermore, the potential of the first, second, and third electrodes X, Yi, and Aj are kept at a ground level before and after the application of the pulse of first voltage, as shown in FIGS. 7A to 7C.

Below, the preferred embodiments of a method and an apparatus for driving a surface discharge plasma display panel according to the present invention will be explained, with reference to the accompanying drawings.

A plasma display panel (PDP) to which the following embodiments are applicable has a cell structure as shown in FIG. 1A. A selected one of the sustain electrodes Yi is represented with Ys and the remaining unselected electrodes by Yt. A line of cells corresponding to the sustain electrode Ys is called a selected line, and a line of cells including one of the sustain electrodes Yt is called an unselected line. In the selected line, those of the address electrodes Aj corresponding to cells to be turned ON are represented with Aa and those to be turned OFF with Ab.

Figure 8:
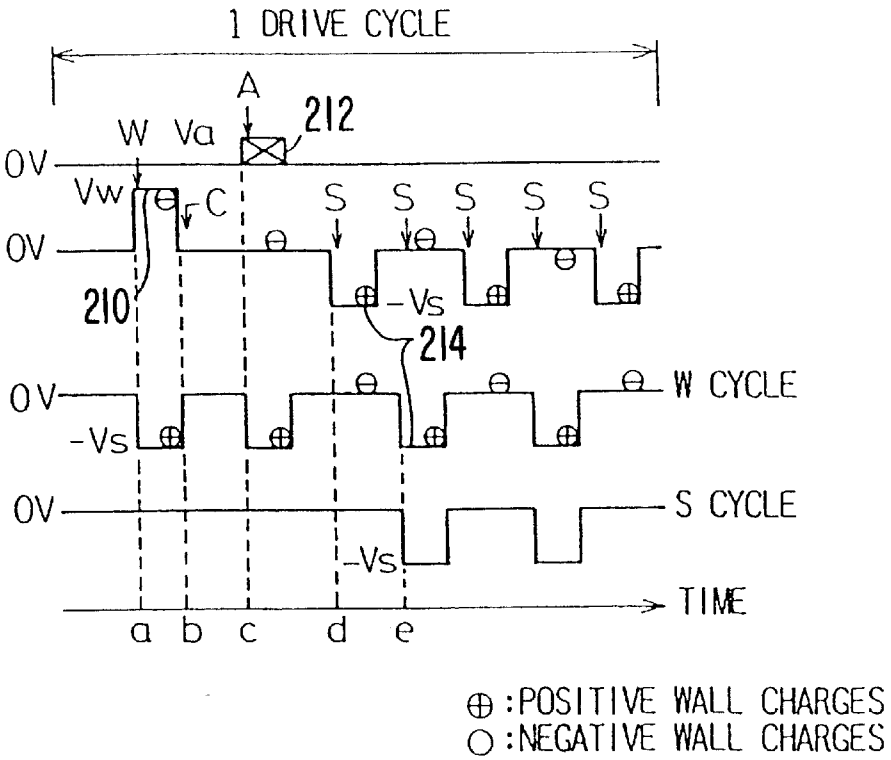
FIG. 8 is a diagram showing voltage waveforms applied to electrodes according a plasma display panel driving method based on a first embodiment of the present invention.

FIG. 8 shows a drive cycle of voltage waveforms applied to the electrodes according to a PDP driving method based on a first embodiment of the present invention. In FIG. 8, (i) , (ii), (iii) and (iv) are waveforms of address electrodes Aj, sustain electrodes X, selected sustain electrode Ys and unselected sustain electrode Yt, respectively. In FIG. 8, reference mark W denotes a write discharge in all cells in a selected line (total write discharge), C denotes a self-erase discharge in all cells in the selected line (total self-erase discharge), A denotes write address discharge in specified cells in the selected line, and S denotes a sustain discharge. Note that the method of this first embodiment is a line-by-line write address method, and thus the sustain electrodes Yi are sequentially selected from Y1 to Yn.

Note that, references 1-a to 1-e, 2-a to 2-f, 3-a to 3-e, and 4-a to 4-e denote processes.

(1-a) First, the address electrodes Aj and sustain electrodes Yt are set to 0V, and a write pulse 210 of Vw is applied to the sustain electrodes X. At the same time, a pulse of −Vs is applied to the sustain electrode Ys. Before this process (1-a), i.e., in the last stage of a drive cycle of FIG. 8, zero or positive wall charges are accumulated on the electrodes X, and zero or negative wall charges are accumulated on the sustain electrode Ys. This is done by oppositely setting the polarity of the write pulse and the polarity of the last sustain pulse in the drive cycle.

The potential values Vw and Vs are set as follows:

$$Vw+Vs>=Vf \quad (4)$$

Accordingly, write discharge W is caused between the sustain electrodes X and Ys in all cells in the selected line. For example, Vw=130V, Vs=180V, and Vf=290V. Since the voltage Vw+Vs of the write pulse is sufficiently greater than the voltage Vs of the sustain pulse, strong discharge compared with sustain discharge occurs. As the discharge progresses, negative wall charges accumulate on the sustain electrode X side and positive wall charges on the sustain electrode Ys side. These wall charges reduce the strength of an electric field in the discharge cavity, so that the discharge ends within one to several microseconds. The voltage of the wall charges when the discharge ends is Vwall3. The potential Vw is set such that the voltage Vwall3 satisfies the following:

$$Vwall3>Vf \quad (5)$$

(1-b) Next, the sustain electrodes X and Ys are simultaneously returned to 0V. According to the equation (5), a voltage between the wall charges on the sustain electrode X side and the wall charges on the sustain electrode Yi side causes self-erase discharge C. Since the potential differences of the sustain electrode X, sustain electrode Ys, and address electrodes Aj are each 0V and since the magnitude of the discharge is large, space charges produced by the discharge do not accumulate (theoretically zero) as wall charges on the sustain electrodes X and Ys and address electrodes Aj. Accordingly, the space charges recombine in the discharge cavity and are nearly completely neutralized. The cavity may contain a small quantity of charges that have not recombined. These space charges serve as a pilot to easily cause the next address discharge. This is called a priming effect.

A wait time required for nearly completing the self-erase discharge is about 5 to 50 microseconds, e.g., 20 microseconds after the fall of the write pulse, although it depends on the material and size of the cells and the kind and concentration of the sealed gas.

(1-c) Further, the sustain electrodes X and Yt and address electrodes Ab are set to 0V, a pulse of −Vs is applied to the sustain electrode Ys, and an address pulse 212 of Va is applied to the address electrodes Aa. The potential values Va and Vs are set as follows:

$$Vsmin<=Vs<Vfxymin \quad (6)$$

$$Va+Vs>=Vfaymax \quad (7)$$

where Vsmin is a minimum voltage at which all cells in the PDP maintain sustain discharge, Vfxymin is a minimum discharge start voltage between the sustain electrodes X and Y1 to Yn, and Vfaymax is a maximum discharge start voltage between the address electrodes A1 to Am and the sustain electrodes Y1 to Yn.

For the cells to be turned ON, address discharge is caused between the address electrodes Aa and the sustain electrode Ys. This discharge triggers discharge between the sustain electrodes X and Ys. Unlike the prior art of FIG. 2, negative and positive wall charges accumulate on the sustain electrodes X and Ys, respectively, so that sustain discharge pulses to be applied can cause sustain discharge. Unlike the prior art of FIG. 2, the cells to be turned OFF cause no discharge between the sustain electrodes X and Ys.

(1-d) Next, all electrodes are set to 0V, and a sustain pulse 214 of −Vs is applied to the sustain electrodes X, to cause sustain discharge only in the cells where the address discharge has been carried out. This sustain discharge accumulate positive and negative wall charges on the sustain electrodes X and Yi, respectively.

(1-e) Further, all electrodes are set to 0V, and a sustain pulse of −Vs is applied to the sustain electrodes Y1 to Yn, to cause sustain discharge only in the cells where the sustain discharge has been carried out in the process (1-d). This discharge accumulates negative and positive wall charges on the sustain electrodes X and Yi, respectively. Note that the processes (1-d) and (1-e) are repeatedly carried out.

As described above, the first embodiment of the present invention carries out the write discharge in all cells in the selected line and then carries out the self-erase discharge to nearly completely neutralize the wall charges. Accordingly, the conditions of all cells in the selected line are equalized before display data are written in the selected line. This results in expanding the range of the potential Va, always carrying out stable address discharge with no regard to the distribution of charges before the write discharge or changes in temperature, preventing write errors, and improving the display quality of the PDP.

Further, unlike the prior art of FIG. 2, no discharge occurs between the sustain electrodes X and Ys in the cells to be turned OFF in the process (1-c), so that the number of light emitting discharge operations carried out in all cells in the selected line is two in the write cycle, which is ⅔ of the operations used in the prior art. Accordingly, the ratio of the maximum luminance and the minimum luminance for displaying black is increased by 3/2 compared as the prior art, to thereby improve the quality of displaying shades of gray.

Figure 9:
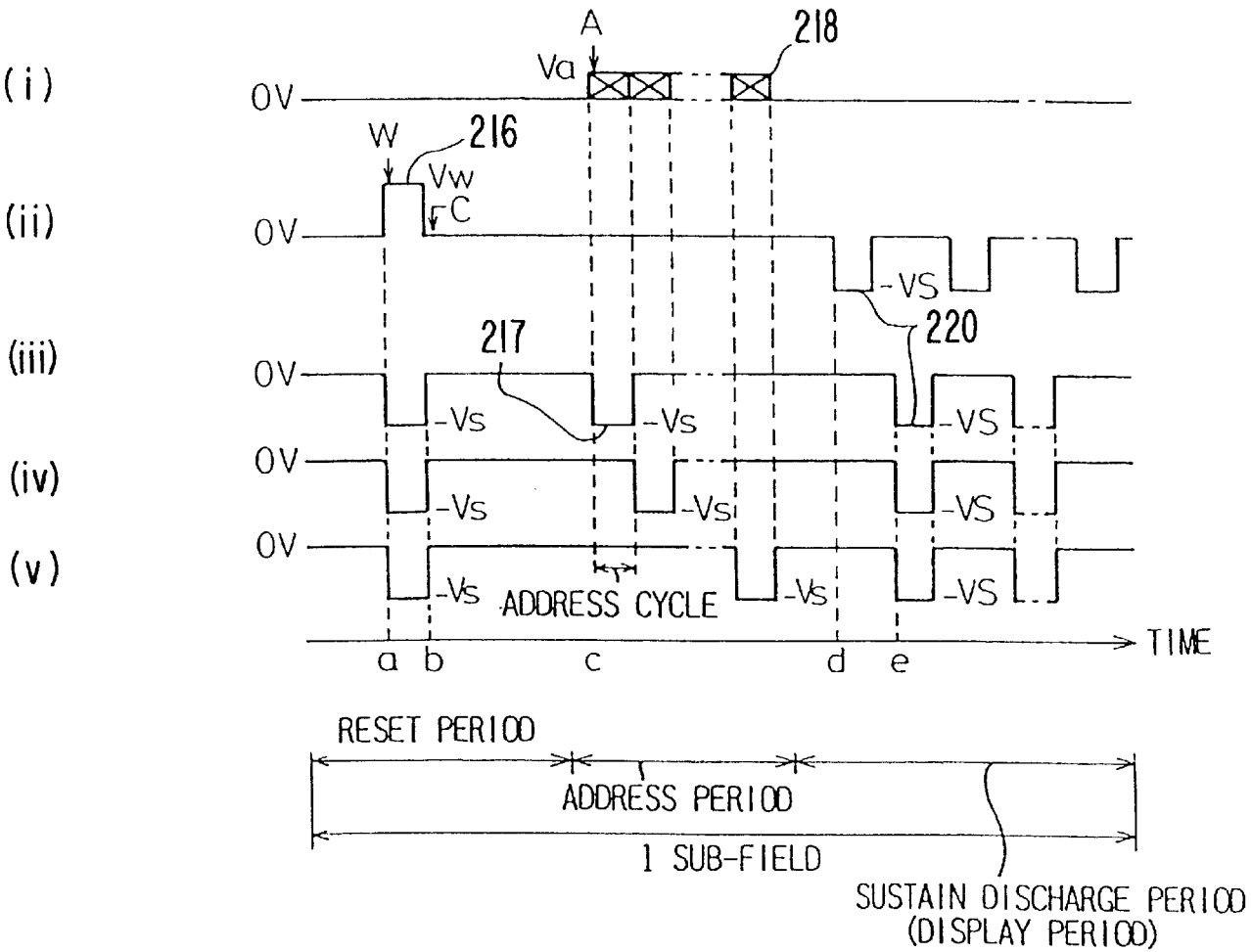
FIG. 9 is a diagram showing voltage waveforms applied to electrodes according to a plasma display panel driving method based on a second embodiment of the present invention.

FIG. 9 shows a sub-field of voltage waveforms applied to electrodes according to a PDP driving method based on a second embodiment of the present invention. Note that this method is a separate address-sustain discharge write address method. In FIG. 9, (i), (ii), (iii), (iv) and (v) are waveforms of address electrode Aj , sustain electrodes X, sustain electrode Y1, sustain electrode Y2 and sustain electrode Y3, respectively. Also, "W" corresponds to a total write discharge, and "C" corresponds to a total self-erase discharge. Further, each sub-field is made of a reset period for nearly completely erasing wall charges in all cells, an address period for carrying out address discharge to accumulate wall charges in cells to be turned ON, to enable the following sustain discharge, and a sustain discharge period for adding a sustain pulse to the wall charges to cause sustain discharge only in the cells in which the address discharge has occurred. In addition, potential values Vw, Vs, and Va satisfy the equations (4) through (7), similar to the first embodiment.

(2-a) First, in the reset period, all electrodes are set to 0V, and a write pulse 216 of Vw is applied to the sustain electrodes X. At the same time, a pulse of −Vs is applied to the sustain electrodes Y1 through Yn. Before the process (2-a), i.e., in the last stage of the sub-field of FIG. 9, the polarity of a sustain pulse applied to the sustain electrodes is opposite to that of the write pulse. Accordingly, zero or positive wall charges are accumulated on the sustain electrodes X and zero or negative wall charges on the sustain electrodes Y1 through Yn. Namely, if there are wall charges, they are always additive to the voltage of the write pulse. This is true for all embodiments mentioned below. As a result, total write discharge W occurs between the sustain electrodes X and Y1 through Yn.

(2-b) Next, since the sustain electrodes X and Ys are simultaneously returned to 0V and equalized to each other and due to the equation (5), a voltage between the wall charges on the sustain electrodes X and the wall charges on the sustain electrodes Y1 through Yn causes self-erase discharge C. As a result, substantially no wall charges are accumulated, and space charges are nearly completely neutralized.

Then, the address period starts.

(2-c) Further, the sustain electrodes X and Y2 through Yn and address electrodes Ab are set to 0V, and a scan pulse 217 of −Vs is applied to the sustain electrode Y1. At the same time, an address pulse 218 of Va is applied to the address electrodes Aa. As a result, address discharge occurs between the address electrodes Aa and the sustain electrode Y1 in cells to be turned ON in the first selected line. This discharge triggers discharge between the sustain electrodes X and Y1, to accumulate negative and positive wall charges on the sustain electrodes X and Y1, respectively. The quantities of the accumulated wall charges are sufficient to carry out sustain discharge with a sustain discharge pulse. No address discharge is caused in cells to be turned OFF, so that no discharge occurs between the sustain electrodes X and Y1 in these cells.

The same operation as the process (2-c) is carried out on the sustain electrodes Y2 through Yn one by one.

Then, the sustain discharge period starts.

(2-d) First, all electrodes are set to 0V, and a sustain pulse of −Vs is applied to the sustain electrodes X, to cause sustain discharge only in the cells where the address discharge has occurred. This sustain discharge accumulates positive and negative wall charges on the sustain electrodes X and Y1 through Yn, respectively. The potential Vs is set as follows:

$$Vs+Vwall4>Vf>Vs \quad (2A)$$

This equation (2A) corresponds to the equation (2).

(2-e) Next, all electrodes are set to 0V, and a sustain pulse 220 of −Vs is applied to the sustain electrodes Y1 through Yn.

(2-f) Therefore, sustain discharge occurs only in the cells that have caused the sustain discharge in the process. This sustain discharge (processes (2-e) and (2-f) accumulates negative and positive wall charges on the sustain electrodes X and Yi, respectively. Note that the processes (2-e) and (2-f) are repeatedly carried out.

As described above, the second embodiment carries out the total write discharge and then the self-erase discharge to nearly completely neutralize wall charges. Accordingly, the conditions of all cells in a selected line are equalized before display data are written in the selected line during the address period. This results in expanding the range of the potential Va, always carrying out stable address discharge with no regard to the distribution of charges before write discharge or changes in temperature, preventing write errors, and improving the display quality of the PDP. Further, the number of discharge emissions in the reset period in each sub-field is two, which is ⅔ of the emission in the prior art. Namely, the ratio of the maximum luminance to the minimum luminance for displaying black is increased by 3/2 of the prior art, to thereby improve the quality of displaying shades of gray.

Figure 10:
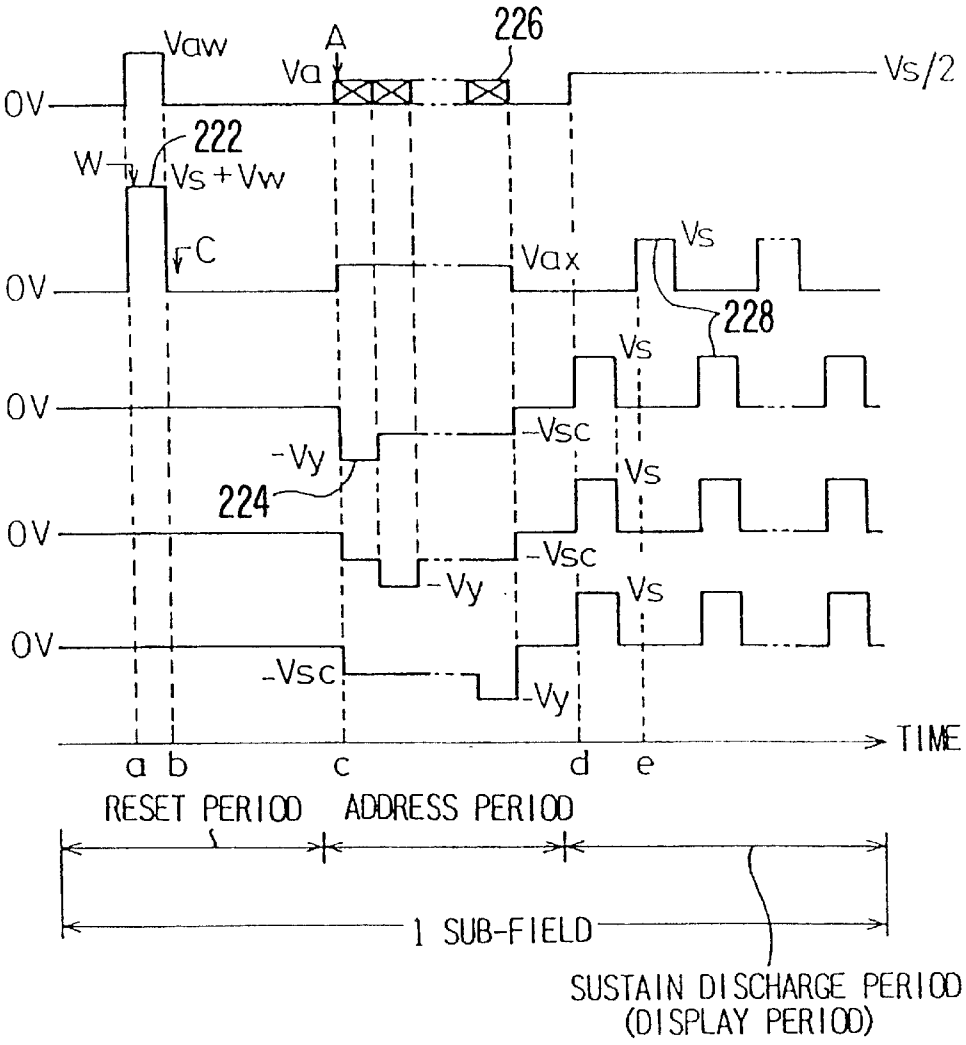
FIG. 10 is a diagram showing voltage waveforms applied to electrodes according to a plasma display panel driving method based on a third embodiment of the present invention.

FIG. 10 shows a sub-field of voltage waveforms applied to the electrodes according to a PDP driving method based on a third embodiment of the present invention. In FIG. 10, (i), (ii), (iii), (iv) and (v) are waveforms of address electrodes Aj, sustain electrodes X, sustain electrode Y1, sustain electrode Y2 and sustain electrode Yn, respectively.

By the way, a scan driver and an X-common driver (X driver) for carrying out sustain discharge and total write discharge consume larger power than other drivers, and are, therefore, large. On the other hand, a positive pulse generator is simpler and cheeper than the negative pulse generator. Therefore, the third embodiment of the present invention employs only positive pulses during the reset and sustain discharge periods.

(3-a) First, in the reset period, all electrodes are set to 0V, and a write pulse 222 of Vs+Vw is applied to the sustain electrodes X. At the same time, a pulse of Vaw is applied to the address electrodes A1 through Am. The reason why the potential of the write pulse 222 is the sum of Vs and Vw is because a power source for the potential Vs is also used for providing a sustain pulse. Accordingly, the power source for the potential Vs is used as a main power source and the potential Vw is added to the potential Vs through a step-up circuit, to provide the potential Vs+Vw.

The potential Vs+Vw is set to satisfy the equation (4). Accordingly, total write discharge W occurs between the sustain electrodes X and Y1 through Yn.

This discharge accumulates wall charges on the address electrodes A1 through Am. The quantity of the wall charges is preferably as small as possible, to equalize the conditions of the address electrodes A1 to Am and stabilize the operations thereof during the address period. If Vaw=(Vs+Vw)/2, the voltage of the address electrodes A1 to Am with respect to the sustain electrodes X and the voltage of the address electrodes A1 to Am with respect to the sustain electrodes Y1 to Yn will have the same absolute value and opposite signs.

Then, the attractive force of the address electrodes A1 to Am on positive charges will be equal to that on negative charges, and therefore, positive and negative charges on the address electrodes A1 to Am are neutralized. As a result, substantially no wall charges accumulate on the address electrodes A1 to Am. On the other hand, the potential Vaw must be low to allow a compact power source circuit. Accordingly, the preferable range of the potential Vaw is as follows:

$$(Vs+Vw)/4<Vaw<=(Vs+Vw)/2 \quad (8)$$

(3-b) Next, as the address electrodes A1 to Am and sustain electrodes X are simultaneously returned to 0V and equalized to each other and due to the equation (5), the wall charges on the sustain electrodes X and the wall charges on the sustain electrodes Y1 to Yn cause self-erase discharge C. Accordingly, substantially no wall charges accumulate, and space charges are nearly completely neutralized.

Then, the address period starts.

(3-c) First, the sustain electrodes X are set to Vax, and the unselected sustain electrodes Y2 to Yn are set to −Vsc. A scan pulse 224 of −Vy is applied to the selected sustain electrode Y1, and at the same time, an address pulse 226 of Va is applied to the address electrodes Aa. The reason why the unselected sustain electrodes Y2 to Yn are set to −Vsc is to lower the potential Va and reduce power consumption. A preferable value for −Vs is around (−Vy+Va)/2.

The potential values Vax, Vy, and Va are set as follows:

$$Vsmin<=Vax+Vy<Vfxymin \quad (6A)$$

$$Va+Vy>=Vfaymax \quad (7A)$$

These equations (6A) and (7A) correspond to the equations (6) and (7), respectively. The address electrodes Aa and sustain electrode Y1 in the cells to be turned ON in the first selected line cause address discharge, which triggers discharge between the sustain electrodes X and Y1. As a result, negative and positive wall charges are accumulated on the sustain electrodes X and Y1, respectively. The quantities of the wall charges are sufficient to cause sustain discharge in response to a sustain discharge pulse to be applied later. No address discharge occurs in the cells to be turned OFF, and therefore, no discharge occurs between the sustain electrodes X and Y1 in these cells.

A preferable value of the potential Vax will be explained. It is preferable to reduce the load on an address driver involving a relatively large number of switching operations as much as possible, to reduce total power consumption. Namely, it is required to reduce the potential Va applied to the address electrodes within the limit defined by the equation (7A). In consideration of the mechanism that discharge between the address electrodes Aa and the sustain electrode Ys triggers discharge between the sustain electrodes X and Ys, to accumulate wall charges required for sustain discharge, the voltage Vax+Vy between the sustain electrodes X and Ys may be increased under the restriction of the equation (6A), to lower the potential Va. Then, weak discharge between the address electrodes Aa and the sustain electrode Ys may trigger sufficient discharge between the sustain electrodes X and Ys.

Setting Vax=Va reduces the number of the power source voltages, to simplify the power source circuit.

The sustain discharge period starts.

(3-d) First, the address electrodes A1 to Am are set to Vs/2, and the sustain electrodes X are set to 0V. Under this state, a sustain pulse 228 of Vs is applied to the sustain electrodes Y1 to Yn.

When the address electrodes A1 to Am are at 0V, the negative wall charges on the address electrodes A1 to Am and the positive wall charges on the sustain electrodes Y1 to Yn produced by the address discharge are added to the first sustain pulse, so that discharge occurs between the address electrodes A1 to Am and the sustain electrodes Y1 to Yn before sustain discharge occurs between the sustain electrodes X and Y1 to Yn. Then, the sustain discharge will not occur between the sustain electrodes X and Y1 to Yn. To prevent this, the positive voltage (potential Vs/2) is applied to the address electrodes Al to Am, to cancel an electric field produced by the negative wall charges on the address electrodes A1 to Am. Due to the same reason as in the case of the potential Vaw, the address electrodes A1 to Am are set to Vs/2, to reduce ions moving toward the address electrodes A1 to Am during the sustain discharge. This protects the phosphor 15 from sputtering. Note that the potential Vs is set to satisfy the equation (2A), and therefore, total sustain discharge S occurs between the sustain electrodes X and Y1 to Yn.

(3-e) Next, the address electrodes A1 to Am are set to Vs/2, and the sustain electrodes Y1 to Yn to 0V. Under this condition, a sustain pulse 228 of Vs is applied to the sustain electrodes X.

Thereafter, the sustain electrodes Y2 through Yn are sequentially subjected to the processes (3-d) and (3-e).

In the above description, when the first sustain pulse is applied to the sustain electrodes Y1 to Yn in the sustain discharge period, the address electrodes A1 to An are set to Vs/2, and then the output of the address electrode drive circuit may be set to high impedance. In this case, power for maintaining the output of the address electrode drive circuit at Vs/2 can be eliminated to save power. In some cases, the output end of the address electrode drive circuit may be set to high impedance to reduce the quantity of ions accumulated on the address electrodes A1 to Am when starting the sustain discharge.

Figure 11:
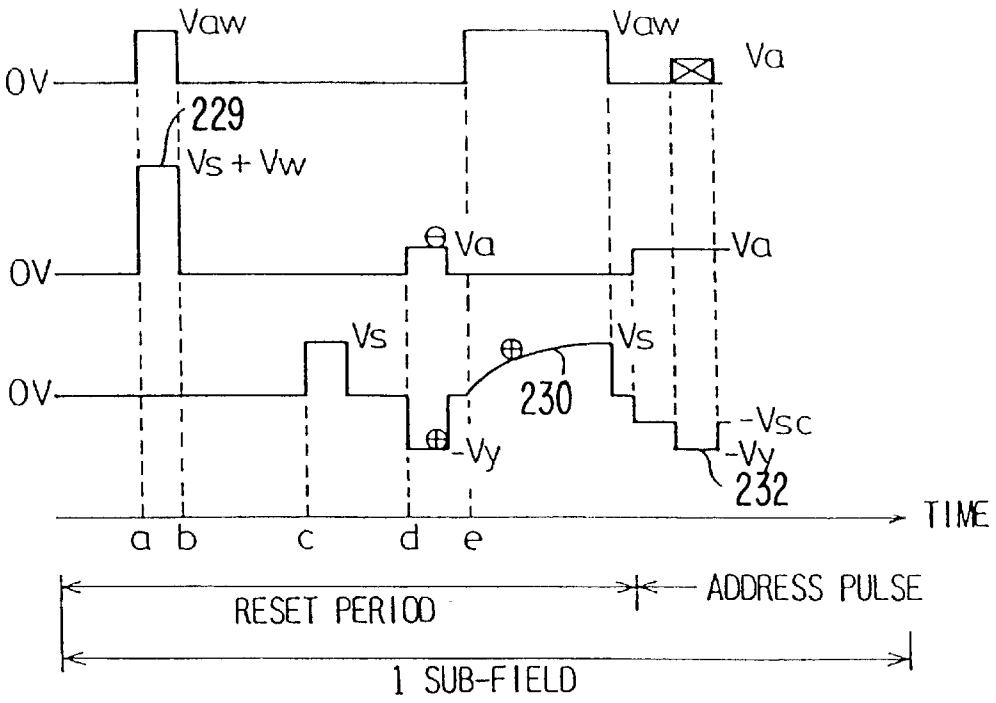
FIG. 11 is a diagram showing voltage waveforms applied to electrodes according to a plasma display panel driving method based on a fourth embodiment of the present invention.

FIG. 11 shows a sub-field of voltage waveforms applied to the electrodes during reset and address periods according to a PDP driving method based on a fourth embodiment of the present invention. In FIG. 11, (i), (ii) and (iii) are waveforms of address electrodes Aj, sustain electrodes X and sustain electrodes Yi, respectively. Also, in FIG. 11, "229" represents a write pulse, and "232" represents a scan pulse.

In this fourth embodiment, processes (4-a) and (4-b) are the same as the processes (3-a) and (3-b) of the above third embodiment. Namely, in normal cells, the processes (4-a) and (4-b) completely neutralize wall charges or reduce them to an extent that no display errors occur due to the remnant wall charges.

On the other hand, due to defects in fabricating the PDP, some cells may have abnormal properties to cause insufficient self-erase discharge and leave a large quantity of wall charges, or achieve no self-erase discharge, to leave wall charges accumulated by total write discharge as they are. These abnormal cells unnecessarily emit light during the sustain discharge period even with no address discharge.

Accordingly, the fourth embodiment forcibly discharges and erases these wall charges before address discharge, to thereby prevent unnecessarily lighting during the sustain discharge period and improve the display quality of the PDP. Note that a wait time required between the processes (4-b) and (4-c) is the same as that of the first embodiment.

(4-c) Next, all electrodes are set to 0V, and a pulse of Vs is applied to the sustain electrodes Y1 to Yn. In response to this pulse, cells that hold a sustain discharge enabling quantity of negative wall charges on the sustain electrodes X relative to the sustain electrodes Y cause discharge. This discharge may invert the polarity of the wall charges, to accumulate positive wall charges on the sustain electrodes X and negative wall charges on the sustain electrodes Y. It is not always necessary to equalize the potential Vs with the potential of a sustain pulse during the sustain discharge period if the equation (6) is satisfied.

(4-d) All electrodes are set to 0V, and a pulse of Va is applied to the sustain electrodes X and a pulse of −Vy to the sustain electrodes Y1 through Ym. The potential of this pulse is the same as that applied to the sustain electrodes X and Yi in the address period. This voltage must satisfy the equation (6A) with Vax=Va. In response to the pulse, cells in which a discharge enabling quantity of positive wall charges are accumulated on the sustain electrodes X relative to the sustain electrodes Y cause discharge. Due to this discharge, the polarity of the wall charges is inverted to accumulate negative wall charges on the sustain electrodes X and positive wall charges on the sustain electrodes Y.

The polarities of the remnant wall charges are integrated by the discharge of the processes (4-c) and (4-d). In addition, the discharge in the processes (4-c) and (4-d) uniformly distributes wall charges. The voltage of the next erase pulse is added to the wall charges, to adjust the quantity of the wall charges into one that is sufficient to discharge the wall charges.

(4-e) Further, all electrodes are set to 0V, and an erase pulse 230 of Vs is applied to the sustain electrodes Y1 to Yn. This pulse gently rises. At the same time, a pulse of Yaw is applied to the address electrodes A1 to Am. This results in mostly erasing the wall charges even if a discharge start voltage varies from cell to cell. Only a small quantity of wall charges will be left. The remnant wall charges are positive opposite to the polarity of the next address pulse, to prevent unnecessary address discharge or lighting, thereby improving the display quality. The reason why the pulse of Vaw is applied to the address electrodes A1 to Am is to prevent unnecessary discharge between the sustain electrodes Y1 to Yn and the address electrodes A1 to Am.

Other operations are the same as those of the third embodiment, and thus they are omitted.

Figure 12:
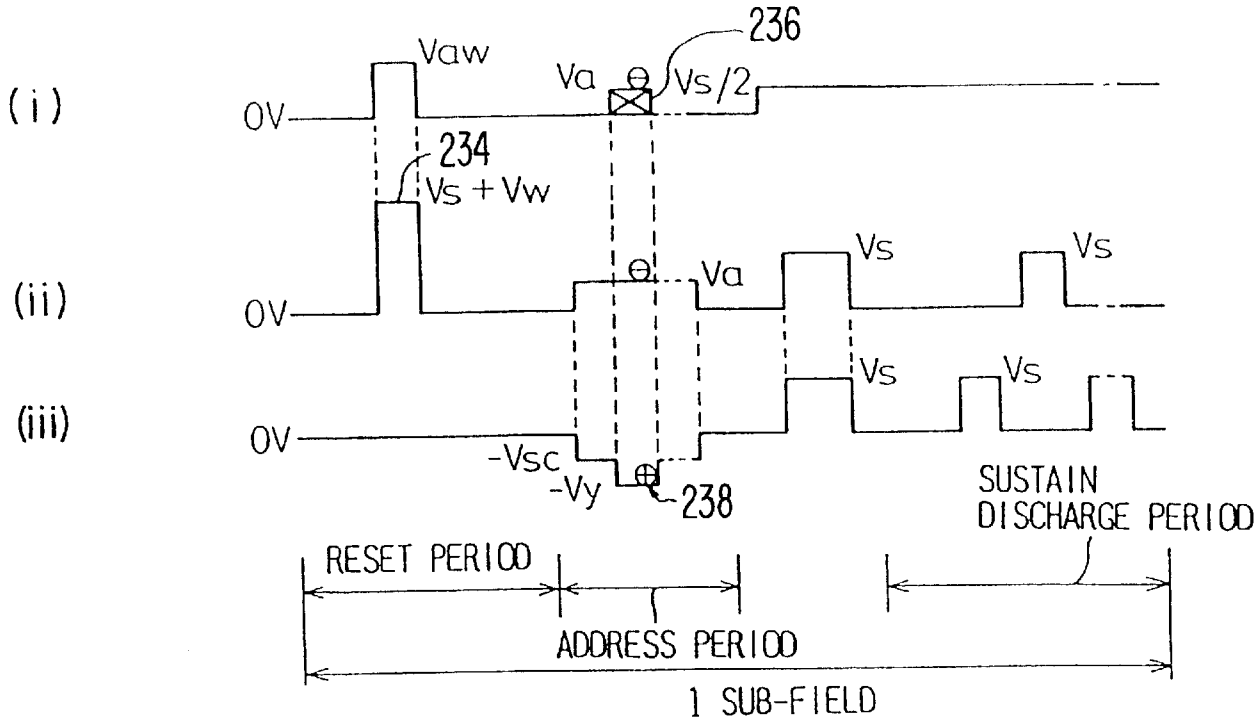
FIG. 12 is a diagram showing voltage waveforms applied to electrodes according to a plasma display panel driving method based on a fifth embodiment of the present invention.

FIG. 12 shows a sub-field of voltage waveforms applied to electrodes according to a PDP driving method based on a fifth embodiment of the present invention. Note that, in this fifth embodiment, operations in reset and address periods are the same as those of the third embodiment. In FIG. 12, (i), (ii) and (iii) are waveforms of address electrodes Aj, sustain electrodes X and sustain electrodes Yi, respectively. Also, in FIG. 12, "234" represents a write pulse, "236" represents an address pulse, and "238" represents a scan pulse.

In cells in which total self-erase discharge has been carried out during the reset period and as well as address discharge during the address period, negative wall charges are accumulated on the sustain electrodes X, positive wall charges are accumulated on the sustain electrodes Yi, and negative wall charges are accumulated on the address electrodes Aj. If the quantity of the negative charges on the address electrodes Aj is greater than that of the wall charges on the sustain electrodes X, discharge will occur between the sustain electrodes Yi and the address electrodes Aj, if the potential of the address electrodes Aj is lower than that of the sustain electrodes X when a sustain pulse is applied, even if the potential of Vs/2 is applied to the address electrodes Aj. If this discharge occurs, no discharge will occur between the sustain electrodes X and Yi, so that no sustain discharge will be carried out thereafter.

Accordingly, the fifth embodiment partly removes the excessive negative wall charges on the address electrodes Aj by setting the address electrodes Aj to Vs/2 and by applying a pulse of Vs to the sustain electrodes X and Y1 to Yn. In this case, a voltage due to the excessive positive wall charges on the sustain electrodes Y1 to Yn is added to the potential Vs, so that the potential of the sustain electrodes Yi becomes higher than that of the address electrodes Aj, to thereby cause weak discharge. This discharge partly removes the excessive negative wall charges on the address electrodes Aj, so that normal sustain discharge will be continued thereafter. This prevents display errors and improves the display quality of the PDP.

Figure 13:
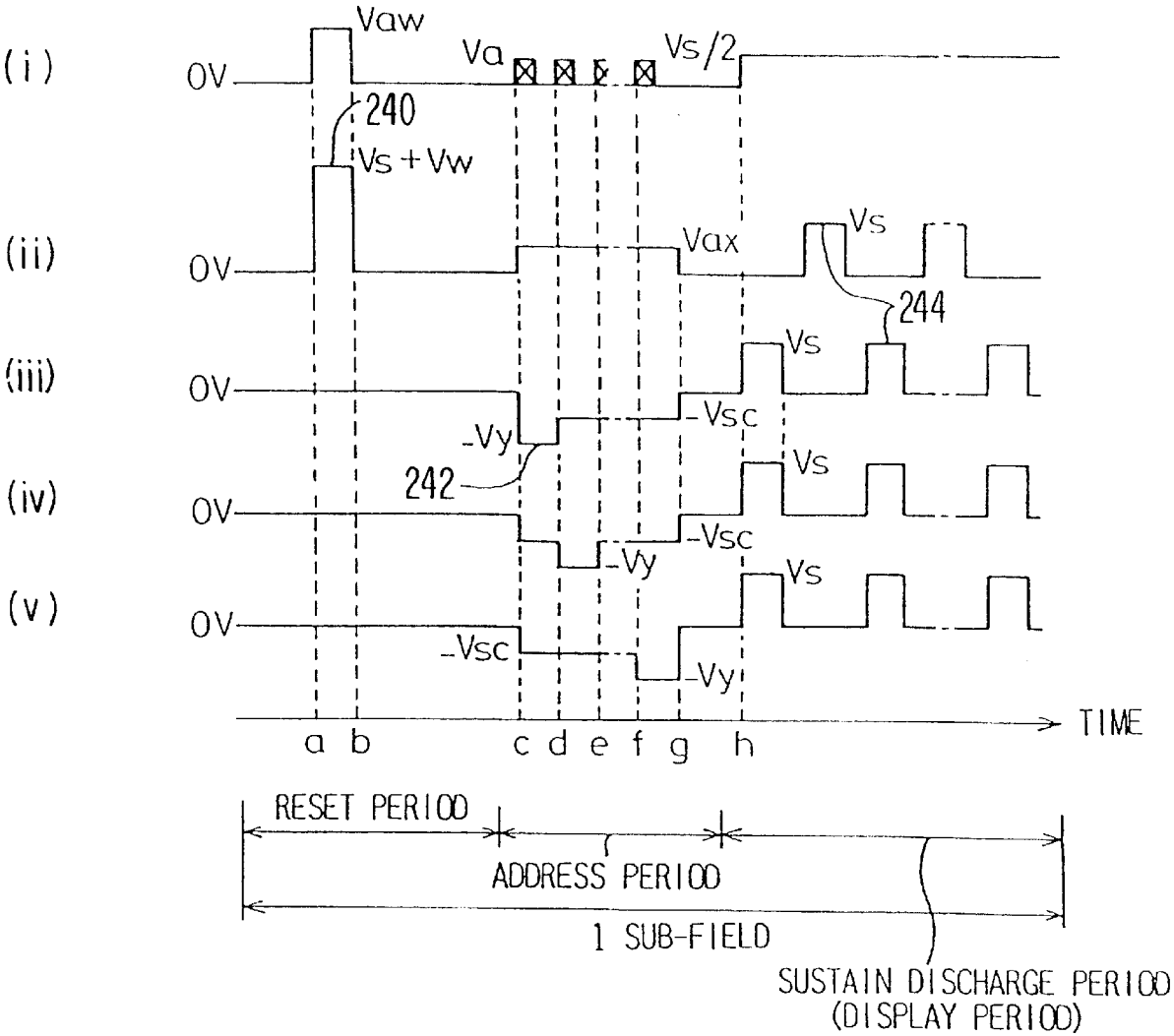
FIG. 13 is a diagram showing voltage waveforms applied to electrodes according to a plasma display panel driving method based on a sixth embodiment of the present invention.

FIG. 13 shows a sub-field of voltage waveforms applied to the electrodes according to a PDP driving method based on a sixth embodiment of the present invention. Note that this sixth embodiment solves the problem mentioned in the fifth embodiment in a different way. Further, operations during reset and sustain discharge periods of the sixth embodiment are the same as those of the third embodiment. In FIG. 13, (i), (ii), (iii), (iv) and (v) are waveforms of address electrodes Aj, sustain electrodes X, sustain electrodes Yi, sustain electrodes Y2 and sustain electrodes Yn, respectively. Also, in FIG. 13, "240" represents a write pulse, "242" represents a scan pulse, and "244" represents a sustain pulse.

Address discharge started between the address electrodes Aa and the sustain electrode Ys in the address period instantaneously shifts to discharge between the sustain electrodes X and Ys, to produce wall charges sufficient to achieve sustain discharge between the sustain electrodes X and Ys. Then, the discharge ends. A pulse of Va applied to the address electrodes Aa is sufficient if it triggers discharge between the sustain electrodes X and Ys.

Therefore, the potential of the address electrodes Aa is zeroed just after the start of discharge between the address electrodes Aa and the sustain electrode Ys. Since the potential of the address electrodes Aa is lower than that of the sustain electrodes X, the address electrodes Aa will not accumulate negative wall charges comparative to those on the sustain electrodes X. Therefore, a first sustain pulse will not cause discharge between the address electrodes Aa and the sustain electrode Ys, to thereby securing normal sustain discharge. A preferred width of the address pulse is about one to two microseconds with an address cycle of three microseconds, although it is dependent on the kind of the sealed gas and the size and material of the cells.

Figure 14:
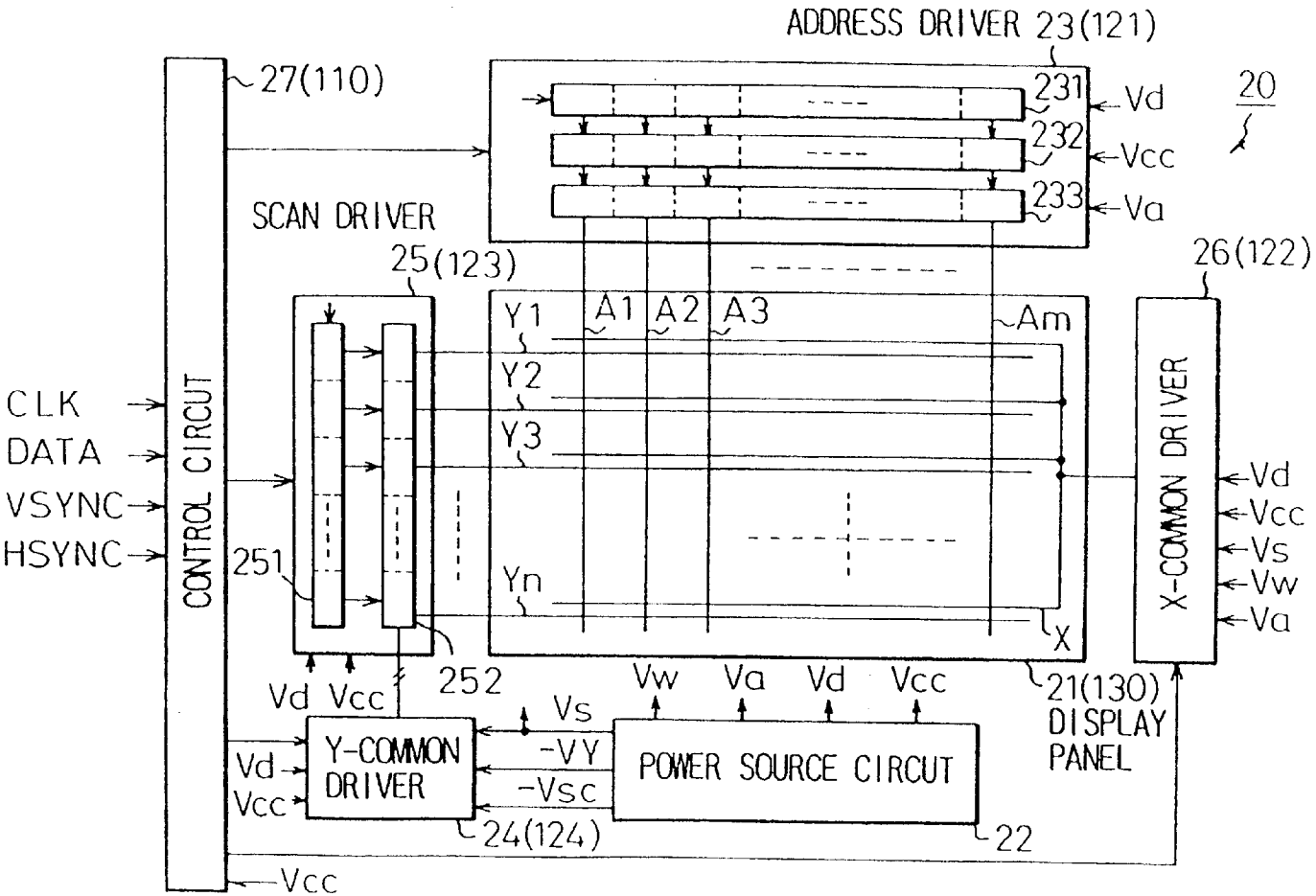
FIG. 14 is a block diagram showing a plasma display unit according to a seventh embodiment of the present invention.

FIG. 14 is a block diagram showing a plasma display unit 20 according to a seventh embodiment of the present invention. The plasma display unit 20 employs the driving method of FIG. 11 (fourth embodiment). In FIG. 14, reference numeral 21 denotes a display panel (130), 22 denotes a power source circuit, 23 denotes an address driver (121), 24 denotes a Y-common driver (Y driver 124), 25 denotes a scan driver (123), 26 denotes an X-common driver (X driver 122), and 27 denotes a control circuit (110).

The display panel 21 has a first glass substrate on which address electrodes A1 to Am are arranged in parallel. A second glass substrate faces the first glass substrate and holds sustain electrodes X and Y1 to Yn that are orthogonal to the address electrodes A1 to Am. The sustain electrodes X form pairs with the sustain electrodes Y1 to Yn. Ends of each of the sustain electrodes X are commonly connected together.

As shown in FIG. 14, the power source circuit 22 generates voltages, which are applied to the electrodes through the address driver 23, Y-common driver 24, scan driver 25, and X-common driver 26. The address driver 23, Y-common driver 24, scan driver 25, and X-common driver 26 are controlled in response to signals provided by the control circuit 27. Note that the control circuit 27 generates these signals according to externally supplied display data DATA, a dot clock signal CLK synchronous to the display data DATA, a vertical synchronous signal VSYNC, and a horizontal synchronous signal HSYNC.

The address driver 23 has a shift register 231 having a serial data input end for receiving serial display data from the control circuit 27 and a clock input end for receiving a shift pulse from the control circuit 27, a latch circuit 232 for latching parallel display data stored in the shift register 231 after the shift register 231 secures display data for a line, and an address electrode drive circuit 233 to be turned ON and OFF in response to an output of the latch circuit 232 and provides a drive voltage in response to a control signal from the control circuit 27. The address electrode drive circuit 233 has m output ends connected to the address electrodes A1 to Am, respectively.

The scan driver 25 has a Y-drive circuit 251 having a serial data input end for receiving "1" in synchronism with the start of an address period in each sub-field and a clock input end for receiving a shift pulse synchronous to an address cycle, and a Y-drive circuit 252 that is turned ON and OFF in response to output bits from the Y-drive circuit 251 and provides a drive voltage in response to a control signal from the control circuit 27. The Y-drive circuit 252 has output ends connected to the sustain electrodes Y1 to Yn, respectively. The Y-common driver 24 provides a common drive voltage to the sustain electrodes Y1 to Yn through the Y-drive circuit 252. Note that, in FIG. 14, potential Vcc is for logic circuits, and potential Vd is for drive circuits.

Figure 15:
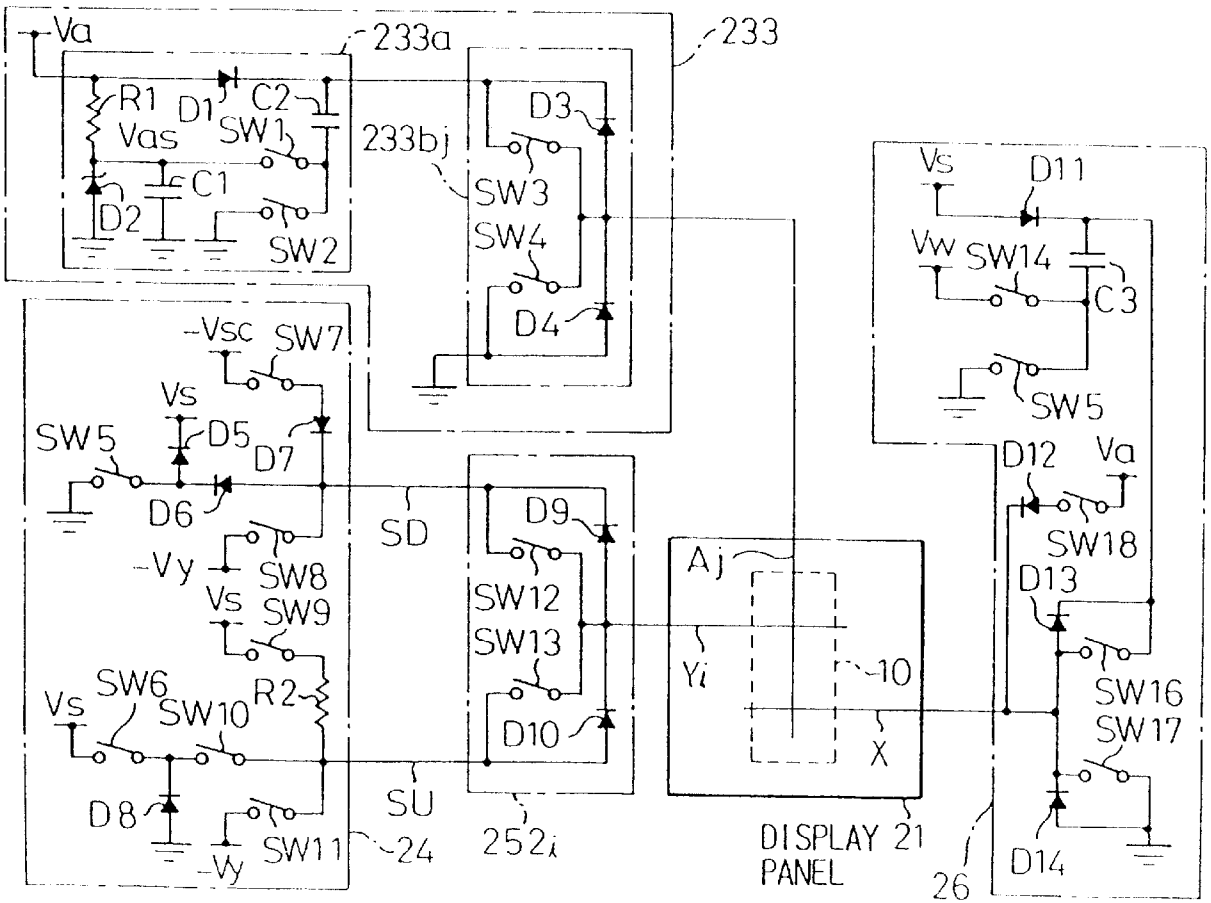
FIG. 15 is a circuit diagram schematically showing drive circuits for a display cell contained in the unit of FIG. 14.

FIG. 15 shows the drive circuits of the address driver 23, Y-common driver 24, scan driver 25, and X-common driver 26 for a cell 10 in the display panel 21. In FIG. 15, reference numeral 233 denotes an address electrode drive circuit, 24 denotes a Y-common driver, 252i denotes Yi-drive circuits (scan driver), and 26 denotes an X-common driver.

The address electrode drive circuit 233 has a voltage step-up circuit 233a common for the address electrodes Aj, and Aj-drive circuits 233bj whose output ends are connected to the address electrodes Aj, respectively, with j=1 to m. On the other hand, the output end of the voltage step-up circuit 233a is connected to the input end of each of the Aj-drive circuits 233b1 to 233bm.]

In the voltage step-up circuit 233a, a power source line of potential Va is connected to the anode of a diode D1 and to an end of a resistor R1. The other end of the resistor R1 is connected to the cathode of a zener diode D2, an end of a capacitor C1, and an end of a switch element SW1. The other end of the switch element SW1 is connected to an end of a switch element SW2 and an end of a capacitor C2. The other end of the capacitor C2 is connected to the cathode of the diode D1. The anode of the Zener diode D2, the other end of the capacitor C1, and the other end of the switch element SW2 are connected to a ground line.

The voltage step-up circuit 233a provides the potential Va during the address period and the potential Vaw during the other periods. A terminal-to-terminal voltage of the capacitor C1 is equal to the breakdown voltage Vas of the Zener diode D2. The switch element SW1 is OFF and the switch element SW2 is ON during the address period, so that the output voltage of the voltage step-up circuit 233a is Va. During the periods other than the address period, the switch element SW2 is OFF and the switch element SW1 is ON, so that the voltage Va of the capacitor C1 is added to the voltage Vs of the capacitor C2. As a result, the voltage step-up circuit 233a provides Vaw=Va+Vas.

In the Aj-drive circuit 233bj, the anode of a diode D3, the cathode of a diode D4, an end of a switch element SW3, and an end of a switch element SW4 are connected to the address electrode Aj. The cathode of the diode D3 and the other end of the switch element SW3 are connected to an output end of the voltage step-up circuit 233a. The anode of the diode D4 and the other end of the switch element SW4 are connected to the ground line.

When the switch element SW3 is ON and the switch element SW4 is OFF, the voltage step-up circuit 233a provides the address electrode Aj with the output voltage Va or Vaw. When the switch element SW3 is OFF and the switch element SW4 is ON, the address electrode Aj receives 0V.

The Y-drive circuit has the Y-common driver (Y driver) 24 and Yi-drive circuits (scan driver) 252i whose output ends are connected to the sustain electrodes Yi, respectively, with i=1 to n. Output ends of the Y-common driver 24 are connected to the input ends of the Yi-drive circuits 2521 to 252n.

In the Y-common driver 24, an end of a switch element SW5 is connected to the ground line, and an end of a switch element SW6 is connected to a power source line of potential Vs. The other end of the switch element SW5 is connected to the power source line of potential Vs through the anode and cathode of a diode D5, and to a line SD through the cathode and anode of a diode D6. The line SD is connected to a power source line of potential −Vsc through the cathode and anode of a diode D7 and a switch element SW7. The line SD is also connected to a power source line of potential −Vy through a switch element SW8. The other end of the switch element SW6 is connected to the ground line through the cathode and anode of a diode D8, and to a line SU through a switch element SW10. The line SU is connected to the power source line of potential Vs through a resistor R2 and a switch element SW9, and to the power source line of potential −Vy through a switch element SW11.

In the Yi-drive circuit 252i, the anode of a diode D9, the cathode of a diode D10, an end of a switch element SW12, and an end of a switch element SW13 are connected to the sustain electrode Yi. The cathode of the diode D9 and the other end of the switch element SW12 are connected to the line SD. The anode of the diode D10 and the other end of the switch element SW13 are connected to the line SU.

When the switch element SW8 is ON and the other switch elements are OFF during the reset period, a current from the sustain electrode Yi flows through the diode D9, line SD, and switch element SW8, so that the sustain electrode Yi is set to the potential −Vy. When the switch element SW9 is ON and the other switch elements are OFF, the potential Vs for a gently rising erase pulse is applied to the sustain electrode Yi through the resistor R2 and diode D10. The gradation of the rise of the pulse is determined by the resistor R2 and electrode-to-electrode static capacitance.

The potential Vs for sustain pulses during the reset and sustain discharge periods is applied to the sustain electrode Yi through the switch elements SW6 and SW10 and diode D10 when the switch elements SW6 and SW10 are ON and the other switch elements are OFF.

During the address period, the switch elements SW7 and SW11 are ON and the other switch elements OFF, so that the unselective potential −Vsc and selective potential −Vy are applied to the Yi-drive circuit 252i. At this time, the switch element SW10 is OFF to prevent a current to the power source line of potential −Vy through the diode D8. The diode D6 prevents a current to the line SD through a protective reverse diode (FIG. 16) connected to the switch element SW5. Under this state, the switch element SW13 is turned ON to apply the scan pulse potential −Vy to the sustain electrode Yi. When the switch element SW12 is turned ON, the unselective potential −Vsc is applied to the sustain electrode Yi. These operations are carried out sequentially from i=1 to n.

To zero positive potential on the sustain electrode Yi, the switch element SW5 is turned ON and the other switch elements are turned OFF. As a result, a current flows from the sustain electrode Yi through the diodes D9 and D6 and switch element SW5, to zero the potential of the sustain electrode Yi. To remove negative potential on the sustain electrode Yi, the switch element SW10 is turned ON, and the other switch elements are turned OFF. As a result, a current flows from the diode D8 through the switch element SW10 and diode D10, to zero the potential of the sustain electrode Yi.

In the X-common driver 26, an end of a capacitor C3 is connected to a power source line of potential Vw through a switch element SW14, and to the ground line through a switch element SW15. The other end of the capacitor C3 is connected to the power source line of potential Vs through the cathode and anode of a diode D11, and to the sustain electrode X through a switch element SW16. The sustain electrode X is connected to the ground line through a switch element SW17 and to the power source line of potential Va through the cathode and anode of a diode D12 and a switch element SW18. The switch elements SW16 and SW17 are connected to opposite diodes D13 and D14 in parallel.

The diode D11, capacitor C3, switch element SW13, and switch element SW14 form a step-up circuit. When the switch element SW14 is OFF and the switch element SW15 ON, the cathode potential of the diode D11 becomes Vs. Under this state, the switch element SW15 is turned OFF and the switch element SW14 ON, to step up the cathode potential of the diode D11 from Vs to Vs+Vw. Accordingly, when the switch element SW16 is ON, the potential Vs for a sustain pulse or the potential Vs+Vw for a write pulse is applied to the sustain electrode X.

In the address period, the switch element SW18 is ON and the other switch elements OFF, and therefore, the sustain electrode X holds the potential Va. To drop the sustain electrode X to 0V, the switch elements SW16 and SW18 are turned OFF and the switch element SW17 ON.

When discharge start voltages are Vfxymin=290V and Vfaymax=180 V, power source voltages are as follows:

Vs=180V, Va=50V, Vw=130V

−Vy=−150V, −Vsc=−50V

Vcc=5V, Vd=15V

Figure 16:
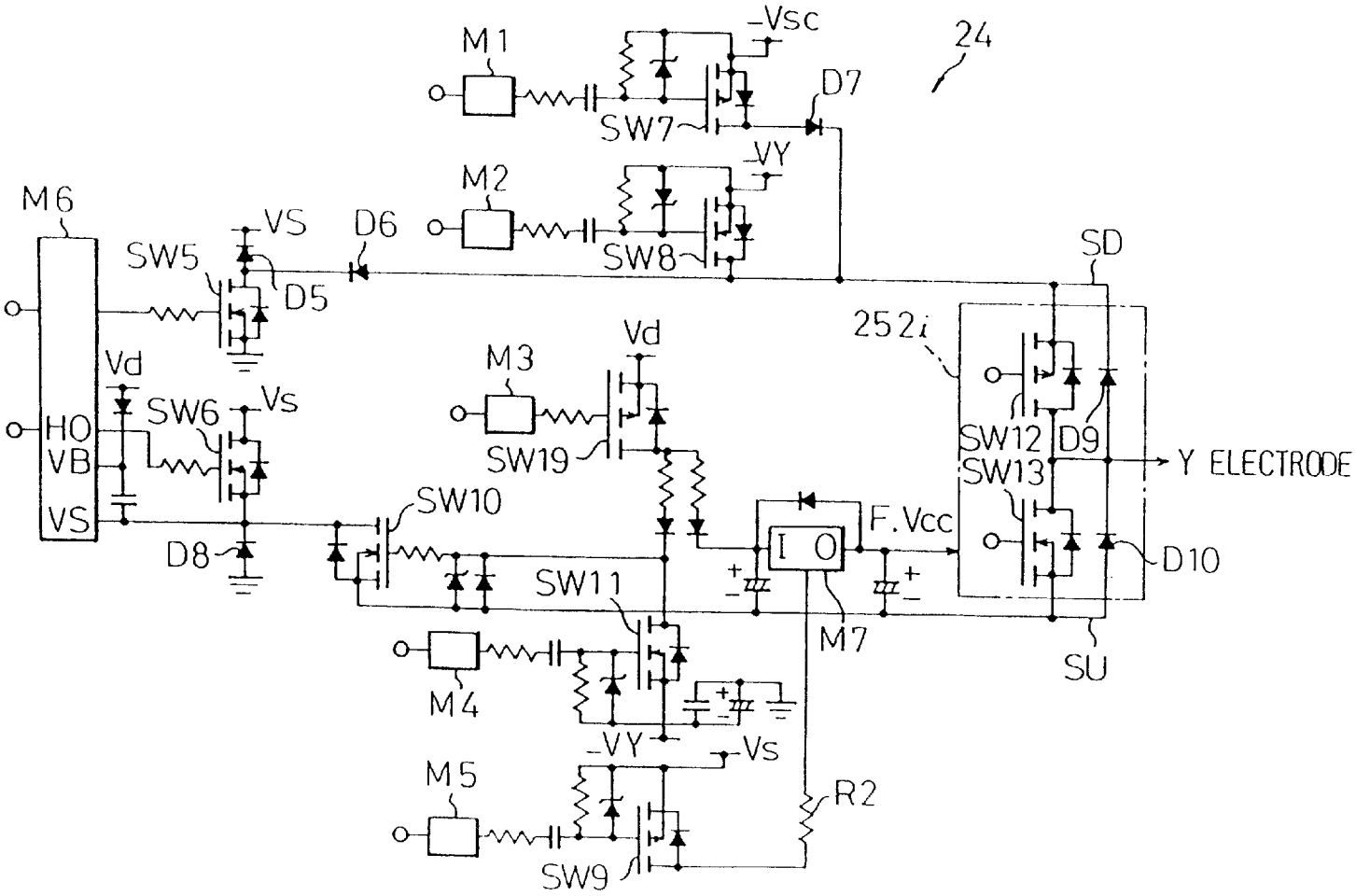
FIG. 16 is a circuit diagram showing the details of a Y-drive circuit of FIG. 15.

FIG. 16 shows the details of the Y-drive circuit of FIG. 15. The switch elements SW5, SW6, SW8, SW10, SW11, and SW13 are nMOS transistors, and the switch elements SW7, SW9, and SW12 are pMOS transistors. A diode is reversely connected between the source and drain of each of the MOS transistors. This diode serves as a MOS transistor protective diode. A resistor is connected between the gate and source of each of the MOS transistors of the switch elements SW7 to SW9 and SW11 This resistor is a leak resistor for the gate potential. A zener diode is connected to the resistor in parallel, to define a gate-source voltage to turn ON the MOS transistor.

In FIG. 16, reference marks M1 to M5 are MOSFET driver ICs (for example, SN75372P from TI Inc.) that are usually used for PDP drive circuits, to generate a gate voltage Vgs for turning ON MOS transistors to be driven. The ON voltage Vgs provides pulses through a capacitor. A reference mark M6 is a MOSFET driver IC (for example, IR2110 from IR company) whose output ends are connected to the switch elements SW5 and SW6, to form a push-pull circuit. A reference mark M7 is a 3-terminal regulator for generating floating 5V (F.Vcc) for the Yi-drive circuit 252i according to potential Vd accumulated in a capacitor on the input I side. The capacitor on the input I side is charged only during a period in which the switch element SW5 is ON to keep the line SU at 0V.

A switch element SW19 turns ON/OFF the potential Vd applied to the input end of the M7 and turns ON the switch element SW10.

The switch element SW11 serves to turn OFF the switch element SW10 and to apply scan potential to the line SU during the address period, to simplify the circuit. When the switch element SW11 is turned ON, a current from the line SU flows through the diode and Zener diode connected between the gate and source of the switch element SW10 and through the switch element SW11 to the power source line of potential −Vy. As a result, the potential of the line SU drops to −Vy. At this time, a voltage between the gate and source of the switch element SW10 becomes 0V to automatically turn OFF the switch element SW10. Accordingly, efficient operation and simple circuit are realized. To again turn ON the switch element SW10, the switch element SW5 is turned ON to set 0V on the lines SD and SU. Then, the switch element SW19 is turned ON to provide the switch element SW10 with the ON voltage Vgs.

According to standard design procedures, a driver having a floating structure must be newly prepared for the switch element SW10. This embodiment requires no such driver, so that the embodiment achieves efficient operation with an inexpensive circuit structure.

Figures 17, 17A:
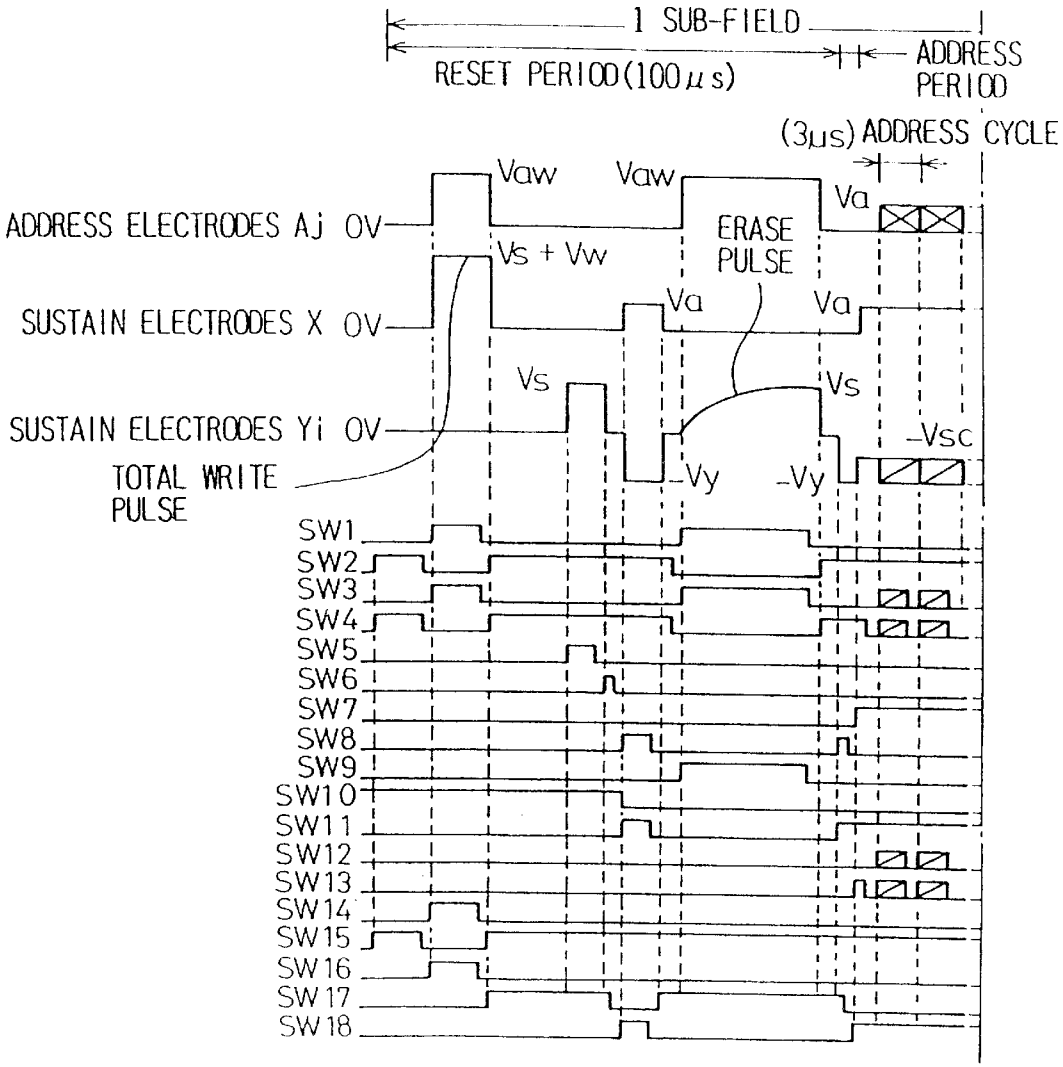
FIG. 17, consisting of FIGS. 17A and 17B, shows voltage waveforms applied to electrodes and the ON/OFF states of switch elements of the circuit of FIG. 15.
Figure 17B:
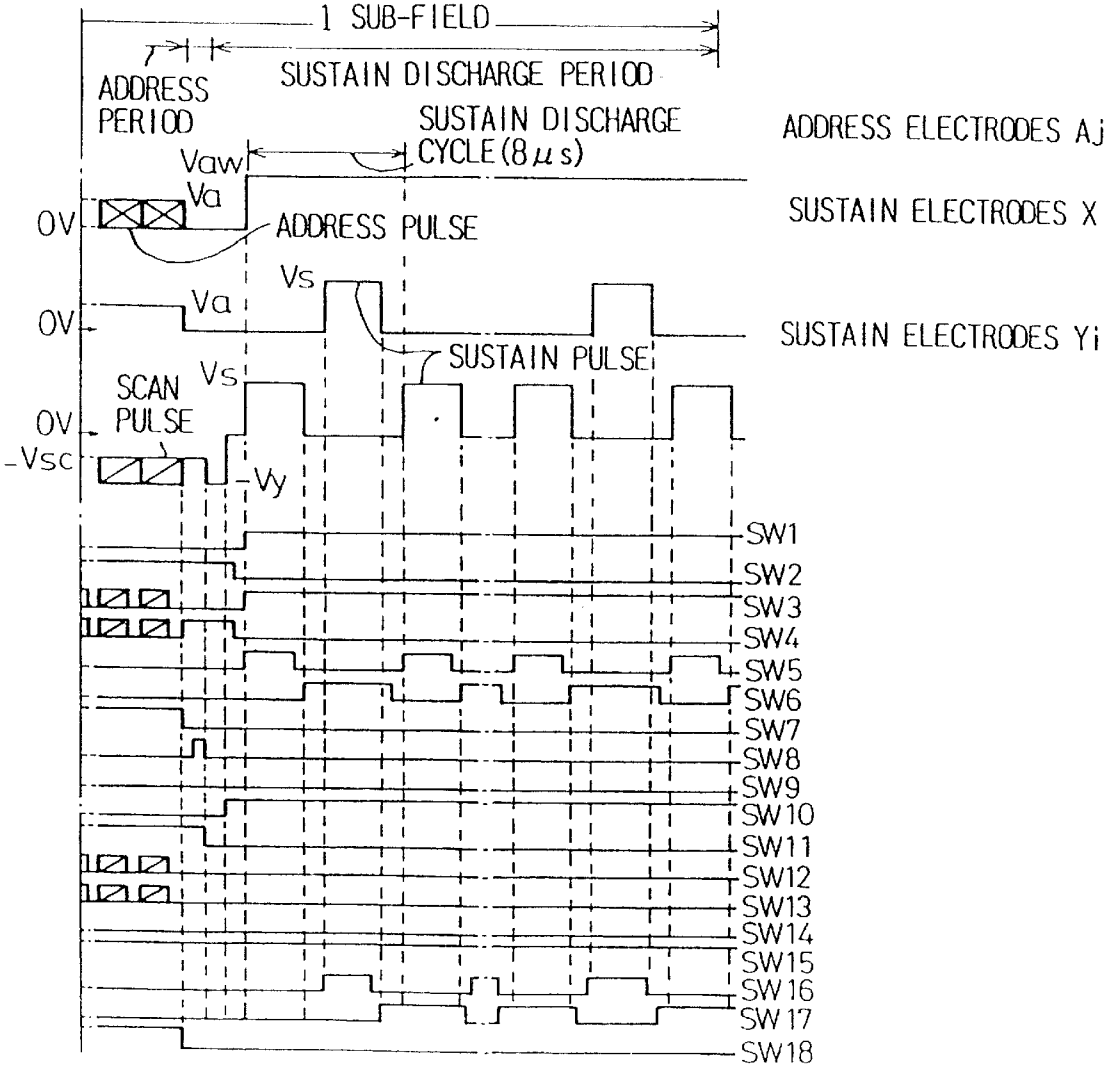

FIGS. 17A and 17B (FIG. 17) show voltage waveforms applied to the electrodes and ON and OFF states of the switch elements of FIG. 15. Values shown in the figures are examples. Explanations of FIGS. 17A and 17B and the dielectric layer 12 will be omitted because they are easily understandable from the explanations mentioned above.

Figure 18:
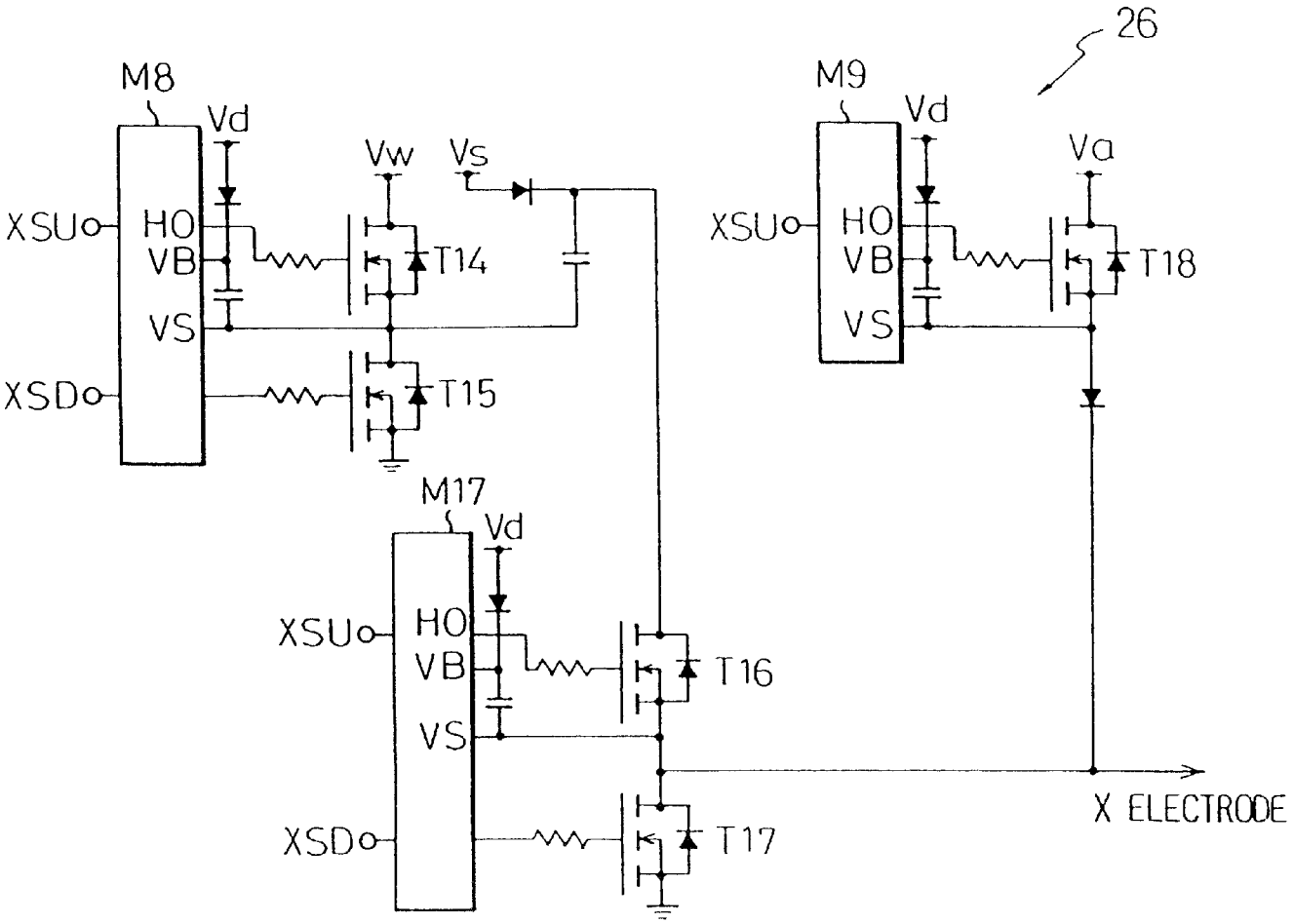
FIG. 18 is a circuit diagram showing an X-drive circuit of FIG. 15.

FIG. 18 shows the X-drive circuit(26) of FIG. 15. In FIG. 18, transistors T14 to T18 correspond to the switch elements SW14 to SW18 of FIG. 15, respectively. Note that the transistors T16 and T17 are constituted by N-channel type MOS (nMOS) transistors in order to flow large currents of the sustain discharge pulse and the sustain discharge current. Further, reference marks M8 to M9 denote MOSFET driver ICs enabling to form a push-pull circuit by using an nMOS transistor as a pull up transistor.

Figure 19:
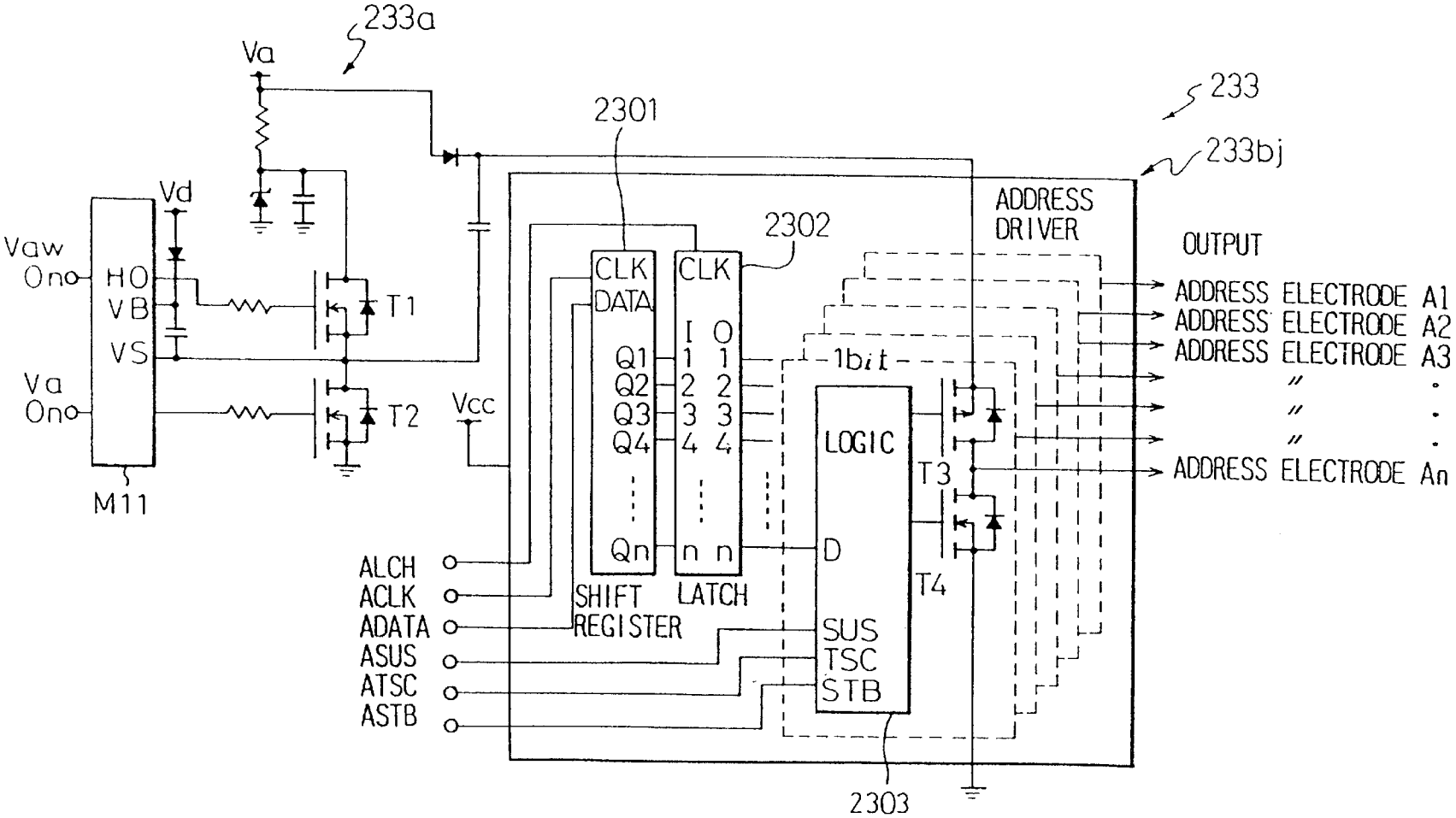
FIG. 19 is a circuit diagram showing an address electrode drive circuit of FIG. 15.
Figure 20:
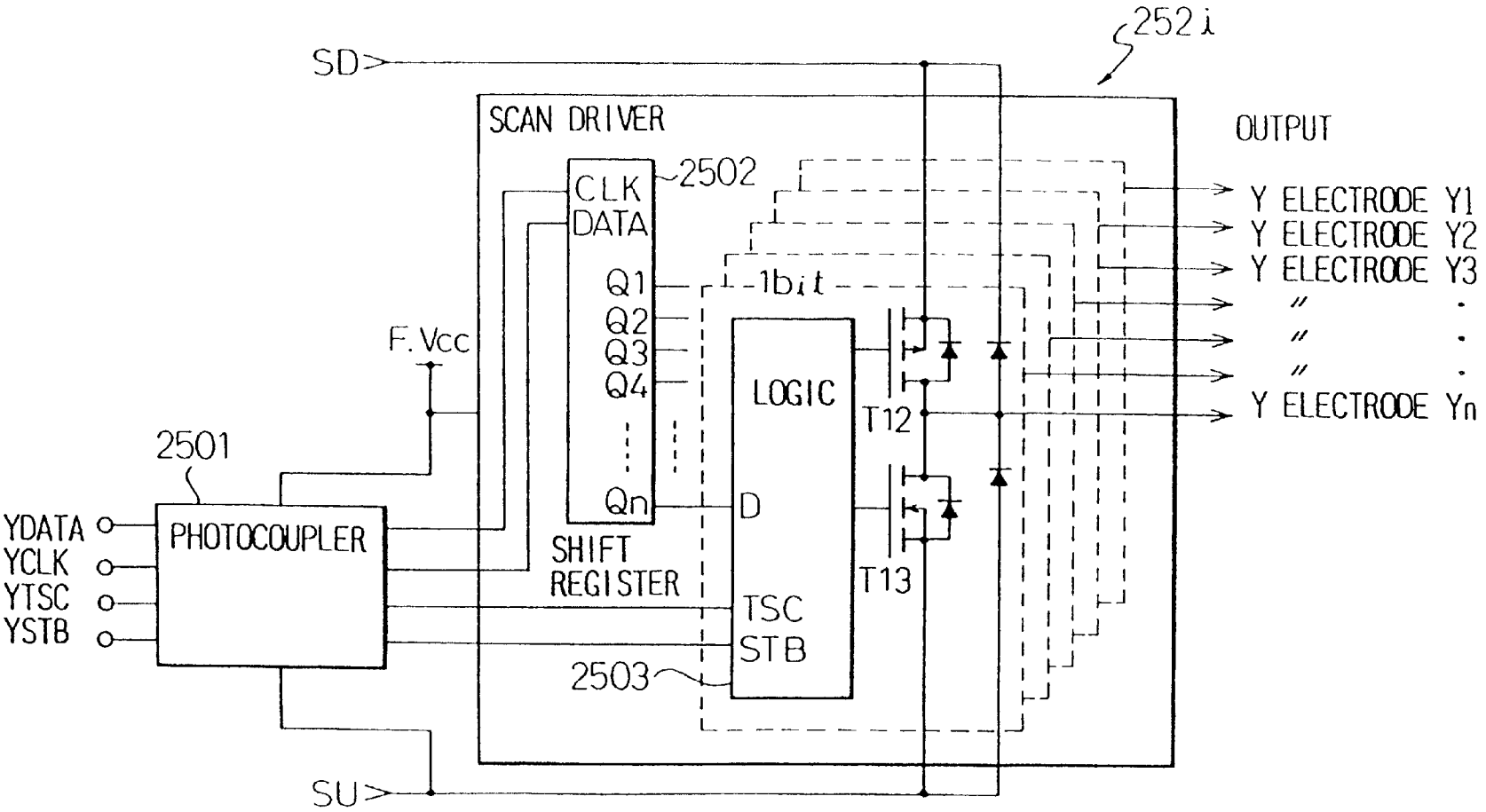
FIG. 20 is a circuit diagram showing a Yi-drive circuit of FIG. 15.

FIG. 19 shows the address electrode drive circuit (233) of FIG. 15, FIG. 20 shows the Y-drive circuit (Yi-drive circuits 252i) of FIG. 15, and FIGS. 21A and 21B show truth tables for the logic circuits of FIGS. 19 and 20. Note that the truth table for FIG. 21A shows an operation of a logic circuit 2303 of the address electrode drive circuit 233 (FIG. 19), and the truth table for FIG. 21B shows an operation of a logic circuit 2503 of the Y-driver circuit 252i (FIG. 20), respectively.

In FIG. 19, transistors T1 to T4 correspond to the switch elements SW1 to SW4 of FIG. 15, respectively. Further, a reference mark M11 denotes a MOSFET driver IC forming a push-pull circuit by using an nMOS transistor as a pull up transistor. Note that the address drivers are integrated, and a plurality of drive circuits (Aj-drive circuits 233bj) corresponding to about 32 to 100 bits are formed in one package (one IC device).

As shown in FIG. 19, the switching operation ON/OFF of each of the address drive circuits 233bj formed in the one IC device is controlled by timing control signals (ASUS, ATSC, ASTB), display data (ADATA), and data transfer signals (ACLK, ALCH). The display data ADATA is shifted by an internal shift register 2301, and then the display data ADATA is latched by a latch circuit 2302 to convert from serial data to parallel data. Further, the parallel data (D) of the display data (output of the latch circuit 2302) is supplied to each block (each drive circuit 233bj), so that a switching operation (ON/OFF) of each drive circuit 233bj is determined. The logic circuit 2303, which receives the control signals ATSC (TSC), ASUS (SUS), and ASTB (STB) for controlling the ON/OFF timing of the drive circuits 233bj and the parallel data D, is operated in accordance with the truth table shown in FIG. 21A, and thereby the transistors T3 and T4 are switched to control the address voltage of each address electrode.

As shown in FIG. 20, similar to the address electrode drive circuit shown in FIG. 19, a plurality of drive circuits (Yi-drive circuits 252i) corresponding to about 32 to 80 bits are formed in one package (one IC device). Namely, the Y-drive circuit (Yi-drive circuits 252i) are integrated.

As shown in FIG. 20, the switching operation ON/OFF of each of the Yi-drive circuits 252i formed in the one IC device is controlled by timing control signals (YTSC, YSTB), scan data (YDATA), and data transfer signal (YCLK). The scan data YDATA is shifted by an internal shift register 2502, and the scan data YDATA is converted from serial data to parallel data. Further, the parallel data (D) of the scan data (output of the shift register 2502) is supplied to each block (each drive circuit 252i), so that a switching operation (ON/OFF) of each drive circuit 252i is determined. The logic circuit 2503, which receives the control signals YTSC (TSC) and YSTB (STB) for controlling the ON/OFF timing of the drive circuits 252i and the parallel data D, is operated in accordance with the truth table shown in FIG. 21B, and thereby the transistors T12 and T13 are switched to control the address voltage of each address electrode. Note that, in FIG. 20, a reference numeral 2501 denotes a photocoupler. This photocoupler is used to bring the data YDATA and signals YCLK, YTSC, YSTB into the floating state, since the shift register 2502 operates by adding onto the sustain pulses, and the like.

In the above described embodiments of the present invention, various modifications will be possible over the present invention. For example, the cell structure of the PDP according to the present invention is not limited to that of FIG. 1A, if there are arranged pairs of sustain electrodes X and Yi extending in parallel with each other, and address electrodes spaced apart from the sustain electrodes and orthogonal to them. These three kinds of electrodes may be arranged on the same substrate.

Many different embodiments of the present invention may be constructed without departing from the spirit and scope of the present invention, and it should be understood that the present invention is not limited to the specific embodiments described in this specification, except as defined in the appended claims.

I claim:

1. A method of driving a surface discharge plasma display panel having a first substrate and a second substrate spaced apart and facing each other, and first electrodes, second electrodes, and third electrodes arranged between said first and second substrates, said first electrodes being arranged in parallel with said second electrodes, said third electrodes being arranged orthogonal to said first electrodes and said second electrodes, said first electrodes and said second electrodes intersecting with said third electrodes to form respective intersections which each define a corresponding cell that can be selectively turned ON and OFF, a discharge being produced in a respective cell when a first discharge start voltage is applied to the respective cell, wherein said method comprises:

a reset step of applying a pulse of a first voltage to the respective cell, and thereby cause an accumulation of wall charges in the respective cell, the pulse of the first voltage being higher than the first discharge start voltage, a third voltage being caused by the wall charges and being higher than the first discharge start voltage, and said first, second and third electrodes have the same potential after the application of the pulse of the first voltage;

a write step of applying a pulse of a second voltage to said second and third electrodes to select cells to be turned ON; and a sustain discharge step of applying an AC pulse of a fourth voltage to said first and second electrodes.

2. A method of driving a surface discharge plasma display panel as claimed in claim 1, said first and second substrates defining a cavity, and said plasma display panel comprising a wall charge accumulating dielectric layer covering the surfaces of said first and second electrodes, a phosphor formed over said second substrate, and a discharge gas sealed in the cavity, wherein:

said reset step causes a discharge between said first and second electrodes and uniformly distributes wall charges over said dielectric layer;

said write step causes a discharge between said second and third electrodes, so that predetermined quantities or more of first and second wall charges of opposite polarities are accumulated on said dielectric layer on said first and second electrodes, respectively, in said cells to be turned ON;

said sustain discharge step turns ON said cells in which the sum of said third voltage between said first and second wall charges and said fourth voltage having the same polarity as said third voltage exceeds the first discharge start voltage, and alternates the opposite polarity wall charges accumulated on the corresponding cell; and said reset step, said write step, and said sustain discharge step are repeatedly performed so that the polarity of the AC pulse in said sustain discharge step is opposite to the polarity of the pulse of said first voltage in said reset step.

3. A method of driving a surface discharge plasma display panel as claimed in claim 2, said method further comprising:

applying an erase pulse that is lower than said first discharge start voltage and gently rises to said first and second electrodes after the application of the pulse of said first voltage during a reset period, to add the voltage of said erase pulse to said first and second wall charges that have not been erased by the pulse of said first voltage due to abnormalities in said cells, thereby discharging and erasing remnant wall charges.

4. A method of driving a surface discharge plasma display panel as claimed in claim 3, wherein said method integrates and amplifies said first and second wall charges that have not been erased by the pulse of said first voltage due to abnormalities in said cells, said method further comprising:

applying a pulse that is lower than said first discharge start voltage and has an opposite polarity to said first voltage, to said first and second electrodes in an interval between the pulse of said first voltage and said erase pulse; and applying a pulse that is lower than said first discharge start voltage and has the same polarity as said first voltage to said first and second electrodes in an interval between the pulse of said first voltage and said erase pulse, the polarity of said erase pulse is inverted with respect to the polarity of said first voltage, thereby erasing more of the remnant wall charges with said erase pulse.

5. A method of driving a surface discharge plasma display panel as claimed in claim 1, wherein the potential of said third electrodes is substantially equal to the average of the potential of said first and second electrodes during the application of the pulse of said first voltage.

6. A method of driving a surface discharge plasma display panel as claimed in claim 5, further comprising:

generating the pulse of said first voltage during said reset step by setting said second electrodes to a ground level and applying a pulse of a positive voltage to said first electrodes.

7. A method of driving a surface discharge plasma display panel as claimed in claim 5, further comprising:

setting the potential of said third electrodes to a ground level during the application of the pulse of said first voltage.

8. A method of driving a surface discharge plasma display panel as claimed in claim 1, wherein the potential of said first, second, and third electrodes is at the ground level before and after the application of the pulse of said first voltage.

9. A method of driving a surface discharge plasma display panel as claimed in claim 1, wherein a second discharge start voltage applied to said second and third electrodes initiates a discharge and, in said write step, said second voltage is greater that said second discharge start voltage, said write step further comprising:

applying a pulse of a fifth voltage Vs to said first and second electrodes, where $$Vsmin <= Vs < Vfxymin,$$

and Vsmin is a functional minimum for said fourth voltage and Vfxymin is said first discharge start voltage.

10. A method of driving a surface discharge plasma display panel as claimed in claim 9, wherein the fifth voltage is close to said first discharge start voltage.

11. A method of driving a surface discharge plasma display panel as claimed in claim 9, wherein the width of the pulse of said second voltage is narrower than that of the pulse of said fifth voltage.

12. A method of driving a surface discharge plasma display panel as claimed in claim 9, wherein:

the pulse of said second voltage is a positive pulse applied to said third electrodes when the potential of said second electrodes is negative with respect to the ground level and said third electrodes are at the ground level; and the pulse of said fifth voltage is a negative pulse applied to said second electrodes when the potential of said first electrodes is equalized with the potential of said third electrodes.

13. A method of driving a surface discharge plasma display panel as claimed in claim 12, wherein the potential of said second electrodes is about ¼ to ¾ of said fifth voltage.

14. A method of driving a surface discharge plasma display panel as claimed in claim 1, wherein, in said sustain discharge step, the potential of said third electrodes is positive with respect to the ground level.

15. A method of driving a surface discharge plasma display panel as claimed in claim 14, further comprising:

simultaneously applying a positive pulse to said first and second electrodes before the pulse of said fourth voltage is applied in said sustain discharge step, the positive pulse having a potential difference with respect to said third electrodes of approximately ¼ to ¾ of said fourth voltage.

16. A method of driving a surface discharge plasma display panel as claimed in claim 1, wherein an output end of a drive circuit connected to the third electrodes is provided with high impedance in said sustain discharge step.

17. A method of driving a surface discharge plasma display panel as claimed in claim 1, further comprising:

simultaneously subjecting all said cells to said reset step;

sequentially subjecting said second electrodes to said write step; and simultaneously subjecting each of said first and second electrodes to said sustain discharge step.

18. An apparatus for driving a surface discharge plasma display panel having a first substrate and a second substrate spaced apart and facing each other, and first electrodes, second electrodes, and third electrodes arranged between said first and second substrates, said first electrodes being arranged in parallel with said second electrodes, said third electrodes being arranged orthogonal to said first electrodes and said second electrodes, said first electrodes and said second electrodes intersecting with said third electrodes to form respective intersections which each define a corresponding cell that can be selectively turned ON and OFF, a discharge being produced in a respective cell when a first discharge start voltage is applied to the respective cell, wherein said apparatus comprises:

reset means for applying a pulse of a first voltage to a respective cell, and thereby cause an accumulation of wall charges in the respective cell, the pulse of the first voltage being higher than the first discharge start voltage, a third voltage being caused by the wall charges and being higher than the first discharge start voltage, and said first, second and third electrodes have the same potential after the application of the pulse of the first voltage;

write means for applying a pulse of a second voltage to said second and third electrodes to select cells to be turned ON; and sustain discharge means for applying an AC pulse of a fourth voltage to said first and second electrodes.

19. An apparatus for driving a surface discharge plasma display panel as claimed in claim 18, said first and second substrates defining a cavity, and said plasma display panel comprising a wall charge accumulating dielectric layer covering the surfaces of said first and second electrodes, a phosphor formed over said second substrate, and a discharge gas sealed in the cavity, wherein:

said reset means causes a discharge between said first and second electrodes and uniformly distributes wall charges over said dielectric layer;

said write means causes a discharge between said second and third electrodes, so that predetermined quantities or more of first and second wall charges of opposite polarities are accumulated on said dielectric layer on said first and second electrodes, respectively, in said cells to be turned ON;

said sustain discharge means turns ON said cells in which the sum of said third voltage between said first and second wall charges and said fourth voltage having the same polarity as said third voltage exceeds the first discharge start voltage, and alternates the opposite polarity wall charges accumulated on the corresponding cell; and said reset means, said write means, and said sustain discharge means are repeatedly operated so that the polarity of the AC pulse applied by said sustain discharge means is opposite to the polarity of the pulse of said first voltage applied by said reset means.

20. An apparatus for driving a surface discharge plasma display panel as claimed in claim 19, further comprising:

means for applying an erase pulse that is lower than said first discharge start voltage and gently rises to said first and second electrodes after the application of the pulse of said first voltage during a reset period, to add the voltage of said erase pulse to said first and second wall charges that have not been erased by the pulse of said first voltage due to abnormalities in said cells, thereby discharging and erasing remnant wall charges.

21. An apparatus for driving a surface discharge plasma display panel as claimed in claim 20, wherein the polarities of said first and second wall charges that have not been erased by the pulse of said first voltage due to abnormalities in said cells are integrated and amplified by said apparatus, said apparatus further comprising:

means for applying a pulse that is lower than said first discharge start voltage and has an opposite polarity as said first voltage, to said first and second electrodes in an interval between the pulse of said first voltage and said erase pulse; and means for applying a pulse that is lower than said first discharge start voltage and has the same polarity as said first voltage to said first and second electrodes in an interval between the pulse of said first voltage and said erase pulse, the polarity of said erase pulse is inverted with respect to the polarity of said first voltage, thereby erasing more of the remnant wall charges with said erase pulse.

22. An apparatus for driving a surface discharge plasma display panel as claimed in claim 18, wherein the potential of said third electrodes is substantially equal to the average of the potential of said first and second electrodes during the application of the pulse of said first voltage.

23. An apparatus for driving a surface discharge plasma display panel as claimed in claim 22, wherein said reset means further comprises:

means for generating the pulse of said first voltage by setting said second electrodes to a ground level and applying a pulse of a positive voltage to said first electrodes.

24. An apparatus for driving a surface discharge plasma display panel as claimed in claim 22, further comprising:

means for setting the potential of said third electrodes to a ground level during the application of the pulse of said first voltage.

25. An apparatus for driving a surface discharge plasma display panel as claimed in claim 18, wherein the potential of said first, second, and third electrodes is at the ground level before and after the application of the pulse of said first voltage.

26. An apparatus for driving a surface discharge plasma display panel as claimed in claim 18, wherein a second discharge start voltage applied to said second and third electrodes initiates a discharge and said second voltage of the pulse applied by said write means is greater than said second discharge start voltage said write means further comprising:

means for applying a pulse of a fifth voltage Vs to said first and second electrodes, where $$Vsmin <= Vs < Vfxymin,$$

and Vsmin is a functional minimum for said fourth voltage, and Vfxymin is said first discharge start voltage.

27. An apparatus for driving a surface discharge plasma display panel as claimed in claim 26, wherein the fifth voltage is close to said first discharge start voltage.

28. An apparatus for driving a surface discharge plasma display panel as claimed in claim 26, wherein the width of the pulse of said second voltage is narrower than that of the pulse of said fifth voltage.

29. An apparatus for driving a surface discharge plasma display panel as claimed in claim 26, wherein:

the pulse of said second voltage is a positive pulse applied to said third electrodes when the potential of said second electrodes is negative with respect to the ground level and said third electrodes are at the ground level; and the pulse of said fifth voltage is a negative pulse applied to said second electrodes when the potential of said first electrodes is equalized with the potential of said third electrodes.

30. An apparatus for driving a surface discharge plasma display panel as claimed in claim 29, wherein the potential of said second electrodes is about ¼ to ¾ of said fifth voltage.

31. An apparatus for driving a surface discharge plasma display panel as claimed in claim 18, wherein, when said sustain discharge means applies said AC pulse, the potential of said third electrodes is positive with respect to the ground level.

32. An apparatus for driving a surface discharge plasma display panel as claimed in claim 31, further comprising:

means for simultaneously applying a positive pulse to said first and second electrodes before the pulse of said fourth voltage is applied by said sustain discharge means, the positive pulse having a potential difference with respect to said third electrodes of approximately ¼ to ¾ of said fourth voltage.

33. An apparatus for driving a surface discharge plasma display panel as claimed in claim 18, wherein an output end of a drive circuit connected to the third electrodes is provided with high impedance in the sustain discharge means.

34. An apparatus for driving a surface discharge plasma display panel as claimed in claim 18, further comprising:

means for simultaneously subjecting all said cells to said reset means;

means for sequentially subjecting said second electrodes to said write means; and means for simultaneously subjecting each of said first and second electrodes to said sustain discharge means.

35. An apparatus for driving a surface discharge plasma display panel as claimed in claim 18, wherein:

said first electrode receives an output of an X-common driver, said second electrodes receive outputs of Yi-drive circuits, and said third electrodes receive outputs of Aj-drive circuits; and said Yi-drive circuits are connected to a Y-common driver, said second electrodes are driven by a positive pulse during a sustain discharge period, and said second electrodes are driven by negative pulses during an address period.

36. An apparatus for driving a surface discharge plasma display panel as claimed in claim 35, wherein said Y-common driver comprises a first switching means for preventing an unnecessary current flow into said Yi-drive circuits caused by using said positive and negative pulses.

37. An apparatus for driving a surface discharge plasma display panel as claimed in claim 36, further comprising a second switching means which controls said first switching means by applying said negative pulses to said second electrodes through said Yi-drive circuits.

*38. A method of driving a plasma display panel having first and second substrates spaced apart from each other, first, second and third electrodes arranged between said first and second substrates, a plurality of cells being between the first and second substrates, each cell having a discharge gas enclosed therein and being selectively turned ON and OFF, a voltage being applied to at least one electrode of the electrode pair to cause a discharge in a respective cell of the plurality of cells, the method comprising the steps of:*

*(a) for each cell, applying a voltage to at least one electrode of the electrode pair to cause a first discharge in the cell, the first discharge having a strength which causes first wall charges of different polarities to accumulate in the cell with a voltage difference between the first wall charges, wherein the voltage difference causes a self-erase discharge which neutralizes the first wall charges;*

*(b) for each cell selected to be turned ON, applying a voltage to at least one electrode of the electrode pair to cause a second discharge in the cell, the second discharge causing second wall charges to be accumulated in the cell; and*

*(c) for each cell selected to be turned ON, applying AC pulses to the electrode pair to cause a third discharge in the cell, the third discharge being a sustain discharge.*

*39. A method as in claim 38, wherein step (a) is performed before step (b), and step (b) is performed before step (c).*

*40. A method as in claim 39, further comprising the step of:*

*repeating steps (a), (b) and (c), in order.*

*41. A method as in claim 38, wherein the step (a) further comprises, after causing the first discharge, the step of:*

*equalizing potentials of the electrodes of the electrode pair.*

*42. A method as in claim 38, wherein*

*the electrode pair includes first and second electrodes formed on the first substrate,*

*the plasma display panel further includes a plurality of third electrodes, each third electrode, together with the electrode pair, defining a respective cell of the plurality of cells, each third electrode formed on one of the group consisting of the first and second substrates,*

*for each cell, first and second voltages are applied, respectively, to the first and second electrodes, and a third voltage is applied to the third electrode defining the cell, to cause a discharge in the cell, and*

*the step (a) further comprises the steps of, for each cell,*

*(a)(1) setting the first and second electrodes to the first and second voltages, respectively, and the third electrode defining the cell to the third voltage, to cause the first discharge, and*

*(a)(2) after causing the first discharge, equalizing the voltages of the first and second electrodes and the third electrode defining the cell.*

*43. A method of driving a plasma display panel having first and second substrates spaced apart from each other, first, second and third electrodes arranged between said first and second substrates and a cell, comprising the steps of:*

*applying a reset pulse voltage to the cell which causes a self-erase discharge in the cell, the self-erase discharge neutralizing first wall charges accumulated in the cell by a first discharge, the first wall charges increasing a voltage difference in the cell; and*

*applying a write pulse voltage to the cell after applying the reset pulse voltage, the write pulse voltage causing second wall charges to accumulate in the cell causing a sustain discharge when applying a sustain pulse.*

*44. A plasma display panel comprising:*

*first and second substrates;*

*first, second and third electrodes arranged between said first and second substrates, wherein said first and second electrodes intersect with said third electrode to define a cell;*

*a self-erase means for applying a reset pulse voltage to a respective cell to cause a self-erase discharge in the respective cell, the self-erase discharge neutralizing first wall charges accumulated in the respective cell by a first discharge, the first wall charges increasing a voltage difference in the respective cell; and*

*a write means for applying a write pulse voltage to the respective cell after the reset pulse voltage causes a self-erase discharge, the write pulse voltage causing second wall charges for causing a sustain discharge when applying a sustain pulse.*

*45. A method of driving a cell of a plasma display having first and second substrates spaced apart from each other and first, second and third electrodes arranged between said first and second substrates, comprising the steps of:*

*(a) creating a first discharge in the cell, the first discharge causing first wall charges of different polarities to accumulate in the cell with a voltage difference between the first wall charges, the voltage difference causing a self-erase discharge which neutralizes the first wall charges, the first wall charges increasing a voltage difference in the cell;*

*(b) creating a second discharge in the cell after the first wall charges are neutralized, the second discharge causing second wall charges to be accumulated in the cell; and*

*(c) applying AC pulses to the cell after the second discharge causes the second wall charges to be accumulated, the AC pulses causing a sustain discharge in the cell.*

*46. A method of driving a plasma display panel having first and second substrates spaced apart from each other and first, second and third electrodes arranged between said first and second substrates and having a plurality of cells, each cell having a discharge gas enclosed therein and being selectively turned ON and OFF, a voltage being applied to cause a discharge in a respective cell of the plurality of cells, the method comprising the steps of:*

*(a) applying a voltage to each cell to cause an accumulation of first wall charges of different polarities which causes a self-erase discharge to neutralize the first wall charges;*

*(b) applying a voltage to each cell to be turned ON to cause second wall charges to be accumulated in the cell; and*

*(c) applying pulses to each cell selected to be turned ON to cause a sustain discharge.*

* * * * *